United States Patent [19]
Koide et al.

[11] Patent Number: 5,435,098
[45] Date of Patent: Jul. 25, 1995

[54] APPARATUS AND METHOD OF WATER CULTURE AND PLANT HANDLING METHOD

[75] Inventors: Koshi Koide, Soraku; Miyoji Hikida, Nara, both of Japan

[73] Assignee: Sekisui Kaseihin Kogyo Kabushiki Kaisha, Nara, Japan

[21] Appl. No.: 100,313

[22] Filed: Aug. 2, 1993

Related U.S. Application Data

[62] Division of Ser. No. 693,187, Apr. 29, 1991.

[30] Foreign Application Priority Data

Mar. 8, 1991 [JP] Japan .................................. 3-13028

[51] Int. Cl.⁶ .............................................. A01G 31/02
[52] U.S. Cl. ............................................ 47/65; 47/39
[58] Field of Search .................. 47/65 F, 65 D, 39 M

[56] References Cited

U.S. PATENT DOCUMENTS

| | | | |
|---|---|---|---|
| 4,513,533 | 4/1985 | Gething et al. | 47/65 D |
| 4,622,775 | 11/1986 | Glenn et al. | 47/65 F |

FOREIGN PATENT DOCUMENTS

| | | | |
|---|---|---|---|
| 2037013 | 2/1972 | Germany | 47/63 |
| 3341103 | 5/1985 | Germany | 47/65 F |
| 1543961 | 4/1979 | United Kingdom | 47/65 F |

*Primary Examiner*—Ramon S. Britts
*Assistant Examiner*—Joanne C. Downs
*Attorney, Agent, or Firm*—Nikaido, Marmelstein, Murray & Oram

[57] ABSTRACT

A water culture apparatus wherein air space sections are formed between plant containers and a nutrient solution when rafts are floated in a water culture tank filled with the nutrient solution. The plant containers are inserted in vertically oriented channels provided in the raft. The air space sections are formed in order that the plant containers do not get submerged in the nutrient solution. The plants are cultivated by: gradually moving the raft from one end to another end of the water culture tank, movement of the raft corresponding to a state of growth of the plants so that the plants supported by the plant containers reach the other end by the time the plants have grown as a result of having absorbed nutrients from the nutrient solution; and harvesting the plants when each of the rafts reaches the other end of the water culture tank. The plants are handled by: sowing several seeds into each of the plant containers, the seeds in each of the plant containers corresponding in number to a shipping unit of the plants; and preparing the plant containers along with the plants contained therein for shipping once the plants have grown.

11 Claims, 28 Drawing Sheets

APPARATUS AND METHOD OF WATER CULTURE AND PLANT HANDLING METHOD

This is a division of application Ser. No. 07/693,187 filed Apr. 29, 1991.

FIELD OF THE INVENTION

The present invention relates to a water culture apparatus comprising rafts, plant containers, etc. used for water culture or hydroponics, a water culture method using the water culture apparatus, and a plant handling method for plants cultivated accordingly.

BACKGROUND OF THE INVENTION

Water culture or hydroponics is a cultivation method whereby plants are supported in a non-nutrient inert medium composed of quartz sand or the like, cultivation being carried out using a nutrient solution.

A water culture apparatus used for water culture principally comprises: plant containers which support plants during a period between germination and harvesting, and rafts which support a plurality of the plant containers and which are floated on the nutrient solution in order to supply nutrients to the plants.

Water-absorbent material having many lacunae, such as polyurethane foam or rock wool, is used in chips (which serve as the plant containers) in order to supply the plants with sufficient nutrients. Further, as shown in FIG. 30, chips 81 are mutually connected and are used as a unit body in order to reduce manual labor during plant management, sowing etc.

As shown in FIG. 36, a raft 84 is formed of material, such as expanded polystyrene, having a specific gravity lower than the specific gravity of water. The raft 84 has a plurality of vertically oriented channels 86 which support the chips 81. The vertically oriented channels 86 are formed in the raft 84 so as to be completely open from an upper surface to a lower surface of the raft 84. This arrangement permits a lower section of each of the chips 81 to come in contact with a nutrient solution 83 when the chips 81 are inserted into the vertically oriented channels 86. Accordingly, a sufficient amount of the nutrient solution 83 is supplied to the plants.

As shown in FIG. 30, when water culture is carried out, each of the mutually connected chips 81 is soaked sufficiently with the nutrient solution 83. Then, one seed 82 each of the plant is sown into each of the chips 81 and germinated, as shown in FIG. 31. Following this, as shown in FIG. 32, each of the connected chips 81 is separated and particularly well developed seedlings are selected from among those seedlings whose roots are well spread out. As shown in FIG. 33, the selected seedlings are then transplanted into the raft 84 which is floating on the nutrient solution 83. The seedlings are then allowed to grow on the raft 84 until they can be shipped as merchandise.

Plants grown by the method described above are conventionally shipped using the following handling method.

As shown in FIG. 34, the plants along with the chips 81 are taken out from the raft 84. Then, the plants along with the chips 81 are made into several bundles, packed into bags 85 as shown in FIG. 35, and shipped.

However, the conventional water culture method and plant handling method presents a problem in that a great deal of time and effort are required in carrying out the operations.

That is to say, in the conventional water culture method, the cultivator must transplant the chips 81, which support the plants, into the raft 84 when the plants have attained a certain stage of growth. Moreover, in this water culture method, before transplantation is carried out it is necessary to remove each of the chips 81 individually, and during transplantation care must be taken to prevent damage to the roots of the plants. Furthermore, when the grown plants are to be harvested, the cultivator must move around a water culture tank (not shown) which has the raft 84 floating therein, in order to pluck the plants. For these reasons the conventional water culture method presents the problem of requiring a great deal of time and effort for transplantation and harvesting operations.

Moreover, as shown in FIG. 35, in the conventional handling method it is necessary to make the harvested plants along with the chips 81 into several bundles in order to pack them for shipping. In this case, a great deal of labor is required to make the plants into bundles since the plants have been grown singly in each of the individually separated chips 81.

Further, as shown in FIG. 36, as the plants grow, the weight of the raft 84 increases and the raft 84 becomes partly submerged in the nutrient solution 83. Consequently, contact between each of the chips 81 and the nutrient solution 83 increases and excess water collects in the chips 81. This presents a problem in that root bases, the roots and other parts of the plants become over-humid or suffer from oxygen starvation.

In order to improve the growth environment of the plants, a 1979 Japanese Patent Application No. 7693 Laid-Open Publication (Tokukaisho 54-7693) discloses, as shown in FIG. 37, a raft 94 having air chambers 95 provided between channel wall sections 92 of vertically oriented channels 96 and groove sections 93, the groove sections 93 being provided along a rim of the raft 94. Since the buoyancy of the raft 94 increases due to the air chambers 95, even when the weight of the plants increases the raft 94 does not get submerged as much into a nutrient solution 83 as it otherwise would. Accordingly, excess water content in plant containers 91 which are inserted into the vertically oriented channels 96 also decreases.

However, excess water supply in the plant containers 91 also occurs due to a direct water supply resulting from the plant containers 91 being in contact with the nutrient solution 83. In the case of the raft 94 as well, this problem has not yet been resolved and, consequently, it is difficult to satisfactorily prevent excess water content from developing in the plant containers 91 and the problem of the root bases, the roots and other parts of the plants becoming over-humid or suffering from oxygen starvation remains.

SUMMARY OF THE INVENTION

An object of the present invention is to provide a water culture apparatus which prevents root bases of plants from getting submerged in a nutrient solution.

In order to attain the above object, a water culture apparatus of the present invention is characterized by a formation of air space sections between plant containers, which support plants, and a nutrient solution when a raft, in which the plant containers have been inserted, is floated on the nutrient solution.

With the above arrangement, since the air space sections form between the plant containers and the nutrient solution, no contact occurs between the plant containers and the nutrient solution.

Another object of the present invention is to provide a water culture method wherein harvesting of plants can be carried out without the cultivator having to move around a water culture tank.

In order to attain the above object, a water culture method of the present invention is characterized in comprising the steps of: floating a raft, having plant containers inserted therein, from one end of a water culture tank; gradually moving the raft from the one end to another end of the water culture tank, a movement of the raft corresponding to a state of growth of the plants so that the plants supported by the plant containers reach the other end by the time the plants have grown as a result of having absorbed nutrients from the nutrient solution; and harvesting the plants when the raft has reached the other end of the water culture tank.

With the above arrangement, the raft having completely grown plants is normally located at the other end of the water culture tank. Accordingly, since a harvesting operation is normally carried out at the other end of the water culture tank, it is no longer necessary for the cultivator to carry out the harvesting operation by moving around the water culture tank. The harvesting operation thereby becomes rationalized.

Another object of the present invention is to provide a handling method of plants whereby harvested plants can be packed immediately as shipping units.

In order to attain the above object, a plant handling method of the present invention is characterized in comprising the steps of: sowing several seeds into each plant container, the seeds in each of the plant containers corresponding in number to a shipping unit-of the plants; and preparing the plant containers along with the plants contained therein for shipping once the plants have grown.

According to the handling method of plants arranged as described above, the plants that each of the plant containers supports correspond in number to the shipping unit of the plants. Thus, since the harvested plants along with the plant containers can be packed immediately as shipping units, a bundling operation of the plants into shipping units becomes unnecessary and the shipping operation becomes rationalized.

For a fuller understanding of the nature and advantages of the invention, reference should be made to the ensuing detailed description taken in conjunction with the accompanying drawings.

BRIEF DESCRIPTION OF THE DRAWINGS

FIGS. 1 to 6 are process drawings showing a water culture method and a plant handling method.

FIG. 1 is a perspective view showing a step wherein several seeds corresponding in number to a shipping unit of plants are sown into a plant container.

FIG. 2 is a perspective view showing a step wherein each plant container as shown in FIG. 1 is inserted into a raft.

FIG. 3 is a perspective view showing a step wherein the raft shown in FIG. 2 is floated from one end of a water culture tank, and a step wherein the raft gradually moves from the one end to another end of the water culture tank, movement of the raft corresponding to a state of growth of the plants so that the plants supported by the plant containers reach the other end by the time the plants have grown as a result of having absorbed nutrients from the nutrient solution.

FIG. 4 is a perspective drawing showing a step wherein a raft is taken out of a water culture tank for harvesting, the raft having reached the other end of the water culture tank, as shown in FIG. 3

FIG. 5 is a perspective view showing a step wherein a plant container along with plants contained therein are taken out from the raft shown in FIG. 4.

FIG. 6 is a perspective view showing a step wherein several plants are packed into a bag, the plants being supported by a plant container and corresponding in number to a shipping unit.

FIG. 7 is a partially cutaway perspective view of a plant container.

FIG. 8 is a cross-sectional view showing a grown plant being supported from its root base by a cutaway section of the plant container shown in FIG. 7.

FIG. 9 shows a perspective view of a plant container.

FIG. 10 is a plan view of the plant container shown in FIG. 9.

FIG. 11 is a bottom end view of the plant container shown in FIG. 9.

FIG. 12 is a partially enlarged plan view of the plant container shown in FIG. 10.

FIG. 13 is a longitudinal sectional view of the plant container shown in FIG. 9 after it has been inserted into a raft.

FIG. 14 is a perspective view of a plant container having a single fold line, as an example of a variation of the plant container shown in FIG. 9.

FIG. 15 is a longitudinal sectional view of the plant container shown in FIG. 14 after it has been inserted into a raft.

FIG. 16 is a longitudinal sectional view showing a plant container inserted into a raft, the plant container having no fold line formed thereon.

FIG. 17 is a perspective view showing a plurality of rafts floating on a nutrient solution.

FIG. 18 is a partially cutaway perspective view of a vertically oriented channel.

FIG. 19 is a partial longitudinal sectional view showing a vertically oriented channel of a raft FIG. 20 is a partial front view showing a plurality of rafts floating on a nutrient solution.

FIG. 21 is a partial longitudinal sectional view showing a vertically oriented channel having a plant container inserted therein and covered from above by a raft cover.

FIG. 22 is a partial longitudinal sectional view which is orthogonal to the partial longitudinal sectional view shown in FIG. 21 and shows a vertically oriented channel having a plant container inserted therein and covered from above by a raft cover.

FIG. 23 is a plan view of a raft.

FIG. 24 is a partially enlarged plan view of the raft shown in FIG. 23.

FIG. 25 is a longitudinal sectional view of a raft taken in the direction of the arrows substantially along the arcuate line C—C of FIG. 24.

FIG. 26 is a longitudinal sectional view of a raft taken in the direction of the arrows substantially along the arcuate line D—D of FIG. 24

FIG. 27 is a partial longitudinal sectional view of rafts, as shown in FIG. 23, rotated by 180° relative to each other and successively piled up.

FIG. 28 is a partial longitudinal sectional view of rafts, as shown in FIG. 23, successively piled up without being rotated.

FIG. 29 is a plan view of a plurality of rafts floated in a water culture tank, a convex section of one of the rafts fitted into a concave section of another of the rafts.

FIGS. 30 to 35 are process drawings showing a water culture method and a plant handling method.

FIG. 30 is a perspective view showing a step wherein a single plant seed is sown into each of the plant containers after a unit body of mutually connected plant containers is soaked with a nutrient solution.

FIG. 31 is a perspective view showing a germinating state of the seeds sown into each of the plant containers shown in FIG. 30.

FIG. 32 is a perspective view showing a step wherein mutually connected plant containers are separated and those plant containers having well developed seedlings are selected.

FIG. 33 is a perspective view showing a step wherein a raft is floated on a nutrient solution in order to grow the plants after the plant containers of FIG. 32 are inserted into the raft.

FIG. 34 is a perspective view showing a step wherein plants are removed along with plant containers from the raft after the plants have grown to a shipping stage according to the step shown in FIG. 33.

FIG. 35 is a perspective view showing a step wherein the plants shown in FIG. 34 are made into a bundle along with the plant containers and packed in bags.

FIG. 36 is a longitudinal sectional view showing a raft floated on a nutrient solution, the raft having plant containers inserted therein.

FIG. 37 is a longitudinal sectional view showing a configuration of a raft having air chambers in order to increase buoyancy and thereby to prevent excess water from developing in plant containers.

DESCRIPTION OF THE EMBODIMENTS

A first embodiment of the present invention is described hereinbelow referring to FIGS. 1 to 8.

A water culture apparatus of the present embodiment principally comprises plant containers which support plants from a germination stage to a harvesting stage, and rafts which hold a plurality of the plant containers and which are floated on a nutrient solution in order to supply nutrients to the plants.

An explanation of the configuration of the plant containers and the rafts follows hereinbelow, and is followed by an explanation of a water culture method and a plant-handling method for plants cultivated accordingly.

Figure 7:
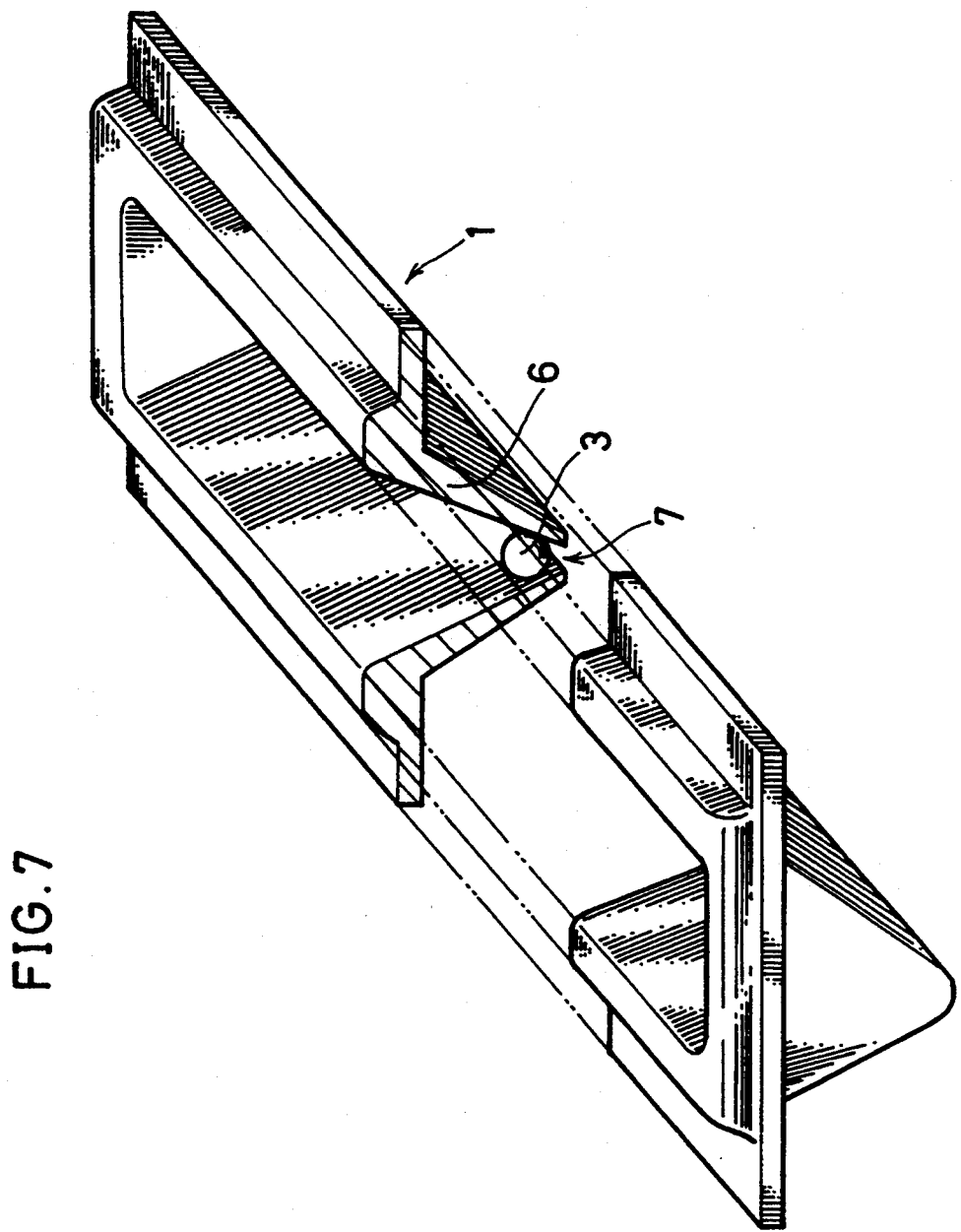

As shown in FIG. 7, a plant container 1 comprises a supporting section 6 which is V-shaped in a cross-sectional view. A base section of the V-shaped supporting section 6 has a slit-shaped cutaway section 7 (passage section) for permitting roots of the plants to pass from an upper- section to an under section of the cutaway section 7. A width of the cutaway section 7 is set to be less than a diameter of seeds 3. Accordingly, the seeds 3 are stably supported on and above the cutaway section 7. Roots that develop from the seeds 3 pass through the cutaway section 7 and reach the nutrient solution. The plant container 1 is formed by an extrusion process from a polystyrene foam sheet or the like.

The width of the cutaway section 7 may be set to be greater than the diameter of the seeds 3 as long as the plant container 1 can support the seeds 3. Further, the cutaway section 7 need not be provided as long as the plant container 1 permits the roots of the seeds 3 to reach the nutrient solution. That is, the base section of the supporting section 6 may equally be formed from porous material such as bonded-fiber fabric, cheesecloth or foamed polyurethane as long as continuous openings (passage sections) extend from an upper surface to an under surface thereof.

Figure 2:
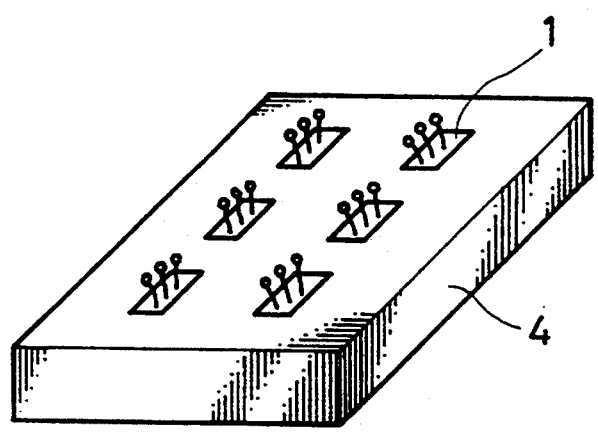
Figure 3:
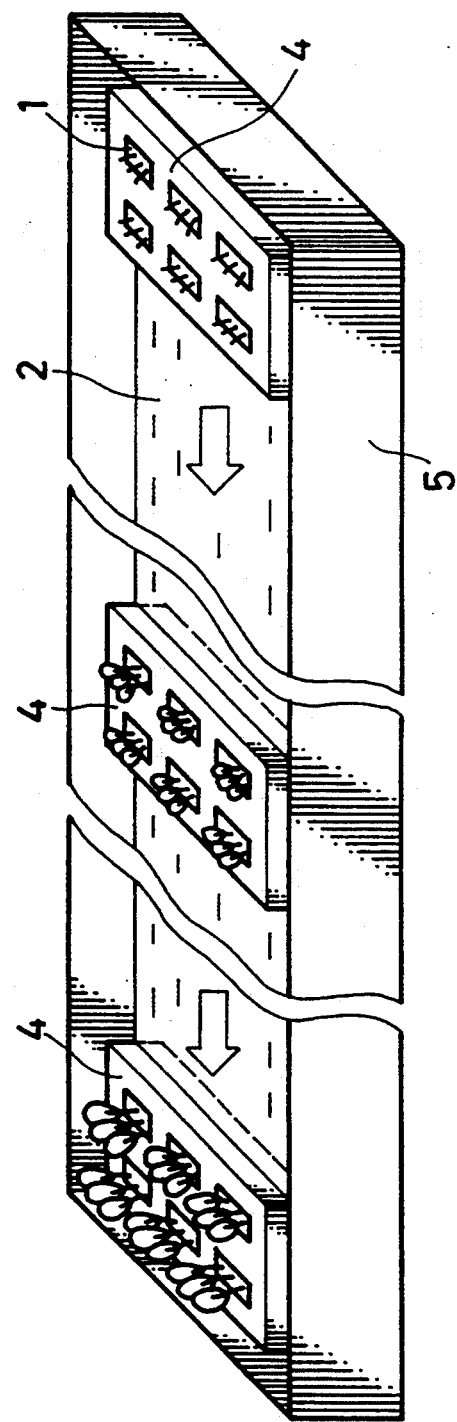

As shown in FIG. 2, a plurality of the plant containers 1 are supported by a raft 4 formed by foaming expandable polystyrene beads using heating steam. A plurality of vertically oriented channels are formed on the raft 4 so as to be completely open from an upper surface to a lower surface of the raft 4. Each of the plant containers 1 is supported by being inserted into the vertically oriented channels. As shown in FIG. 3, the thickness of the raft 4 is set to exceed the depth of the plant containers 1 so that when the raft 4 is floated on a nutrient solution 2, an air space section is formed between the nutrient solution 2 and the base section of the supporting section 6 of each of the plant containers 1 inserted in the vertically oriented channels. In other words, the thickness of the raft 4 is set so that the plant containers 1 are not submerged in the nutrient solution 2. Roots which develop from the seeds 3 pass through the vertically oriented channels and reach the nutrient solution 2. Further, the nutrient solution 2 flows in a direction shown by an arrow in FIG. 3 in a water culture tank 5. Accordingly, fresh nutrients and oxygen can be supplied to the plants from the nutrient solution 2 and the raft 4 moves in the direction of flow of the nutrient solution 2.

Figure 1:
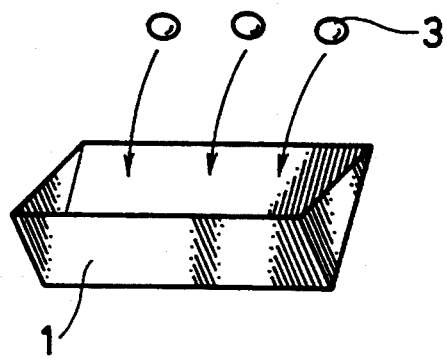
FIGS. 1 to 8 show a first embodiment of the present invention.

With the above arrangement, when water culture is carried out, first the seeds 3 are sown in the plant containers 1 in numbers corresponding to shipping units of the plants, as shown in FIG. 1. Then, as shown in FIG. 2, the plant containers 1 with the seeds 3 sown therein are inserted in the vertically oriented channels of the raft 4. The raft 4 is then kept in a place having humidity and temperature conditions suitable for germination to take place. Once the seeds 3 have germinated, as shown in FIG. 3, the raft 4 is floated from one end of the water culture tank 5 (right end in FIG. 3) which has been filled with the nutrient solution 2.

Moreover, although in the present embodiment the seeds 3 are described as being germinated after being sown in the plant containers 1, it is equally possible to cultivate seedlings of the plants in a culture environment in, for example, other supporting vessels or the like, and transplanting the seedlings to the plant containers 1, thereafter carrying out the cultivation in the rafts 4.

Sprouts of the plants continue to grow while being supported by the supporting sections 6 of the plant containers 1, and the roots absorb nutrients by entering the nutrient solution 2 from the cutaway section 7.

As the plants grow, the raft 4 is gradually transported over the nutrient solution 2 towards another end (left end in FIG. 3). Further, a transport time of the raft 4 is set so that by the time the raft 4 reaches the other end (the left end in FIG. 3), the plants will have grown and will be ready to be shipped.

Figure 4:
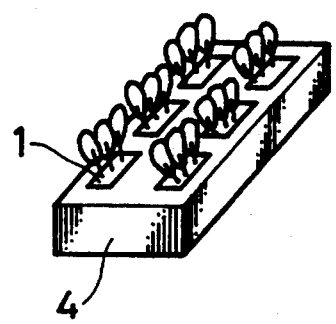
Figure 5:
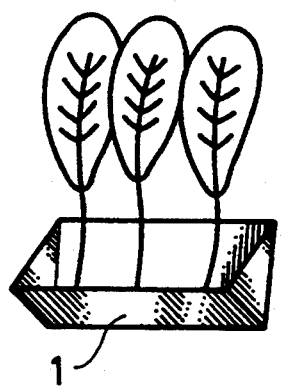
Figure 6:
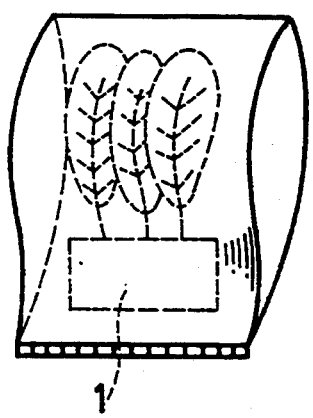

As shown in FIG. 4, the raft 4 is taken out of the water culture tank 5 after it reaches the other end. Then, as shown in FIG. 5, the plants along with the plant containers 1 are taken out from the raft 4. Thereafter, as shown in FIG. 6, each of the plant containers 1 supporting the plants are respectively packed into bags 9 and shipped or, if necessary, the roots of the plants are first cut and removed and then the plants are packed into the bags 9 and shipped. This becomes possible because, as described earlier, the plants are sown in each of the plant containers 1 in numbers corresponding to the shipping unit. Further, the plants need not necessarily be shipped in the bags 9 but may be, for example, packed in boxes or wrapped and then shipped, or may equally be shipped in a harvested state without being wrapped etc.

Thereafter, seeds are again sown in plant containers 1 which are inserted into the raft 1 to replace the plant containers 1 that have been taken out from the raft 4. That is, the raft 4 is re-used.

According to the water culture method described in the present embodiment, the plants are grown throughout in the plant containers 1 from a seed stage until the shipping stage, the plant containers 1 being supported throughout in the raft 4. Consequently, it is no longer necessary to transplant the plants to the raft 4 and time and labor involved in transplantation are thereby saved.

Further, as shown in FIG. 3, the raft 4 is transported from the one end of the water culture tank 5 to the other end, which is the extreme end, according to the flow of the nutrient solution 2. When the raft 4 reaches the other end, the plants will have grown to be in the shipping stage. Consequently, the grown plants are normally collected from the other end of the water culture tank 5. As a result, it becomes possible to save time and labor involved in harvesting because harvesting is carried out only at the other end of the water culture tank 5.

Figure 8:
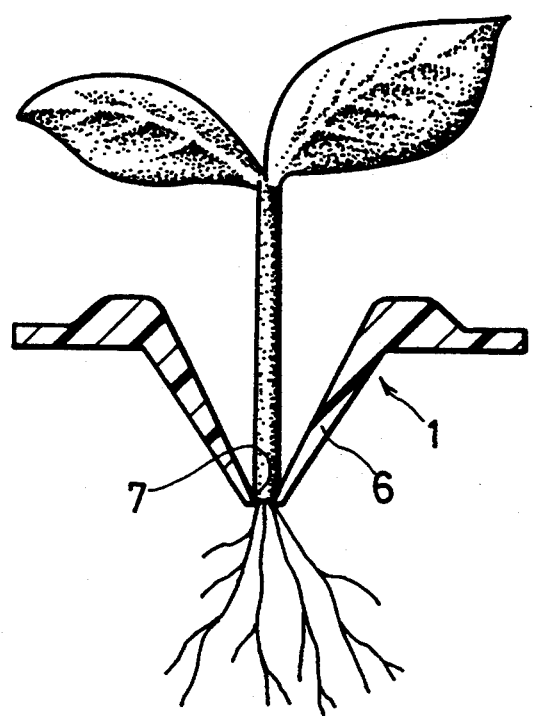

Harvesting is carried out by removing the plant containers 1 from the raft 4. Here, as shown in FIG. 8, the roots of the plants are sufficiently supported by the cutaway section 7 of the plant container 1. As a result, the plant container 1 serves to replace a rope or the like by making the plants into a bundle, thus obviating the necessity of a bundling operation since each of the plant containers 1 supports plants corresponding in number to the shipping unit. Accordingly, handling of the plants during shipping becomes much simpler and time and labor involved in the shipping operation are saved.

Furthermore, although in the present embodiment a method is described as an example wherein, as shown in FIGS. 1 and 2, the plant containers 1 are inserted into the raft 4 after the seeds 3 have been sown in the plant containers 1, the seeds 3 may equally be sown after the plant containers 1 have been inserted into the raft 4.

As described above, the plant container 1 of the present embodiment has the supporting section 6 which is V-shaped in a cross-sectional view. The cutaway section 7 (passage section) is formed at the base section of the supporting section 6 and has a width that does not allow the seeds 3 to pass through.

Accordingly, when the seeds 3 are Sown in the plant container 1, the seeds 3 are stably supported on the base section of the supporting section 6.

Further, according to the water culture method of the present embodiment, the rafts 4 having a plurality of the plant-containers 1 inserted therein are floated from the one end of the water culture tank 5. It is arranged so that the rafts 4 reach the other end of the water culture tank 5 by the time the plants supported in the plant containers 1 have grown to a specified size. Thus, the rafts 4 are made to move gradually from the one end to the other end of the water culture tank 5, movement of the rafts 4 corresponding to the state of growth of the plants. The harvesting operation is carried out for each of the rafts 4 as the rafts 4 reach the other end of the water culture tank 5.

Accordingly, it is no longer necessary to transplant germinated seeds into the rafts 4 since the plants are grown continuously from the seeds 3 in the plant containers 1 until the plants have grown to the specified size. Further, time and labor involved in the operation are reduced since the operation of lifting out each of the rafts 4 takes place only at the other end, which is the extreme end, of the water culture tank 5. This becomes possible because each of the rafts 4 are transported towards the other end corresponding to the growth of the plants.

According to the plant handling method of the present embodiment, the seeds 3 of the plants are sown in the plant containers 1 corresponding in numbers to the shipping unit. When the plants have grown, the plants along with the plant containers 1 are prepared for shipping.

As a result, the plant container 1 serves to replace a rope or the like by making the plants into a bundle, thus obviating the necessity of a bundling operation since each of the plant containers 1 supports plants corresponding in number to the shipping unit. Accordingly, time and labor involved in handling the plants can be reduced.

A second embodiment of the present invention is described hereinbelow, referring to FIGS. 9 to 16.

The present embodiment describes a plant container that provides a better growing environment and a higher percentage of root penetration during germination than the plant container 1 described in the first embodiment.

Figure 9:
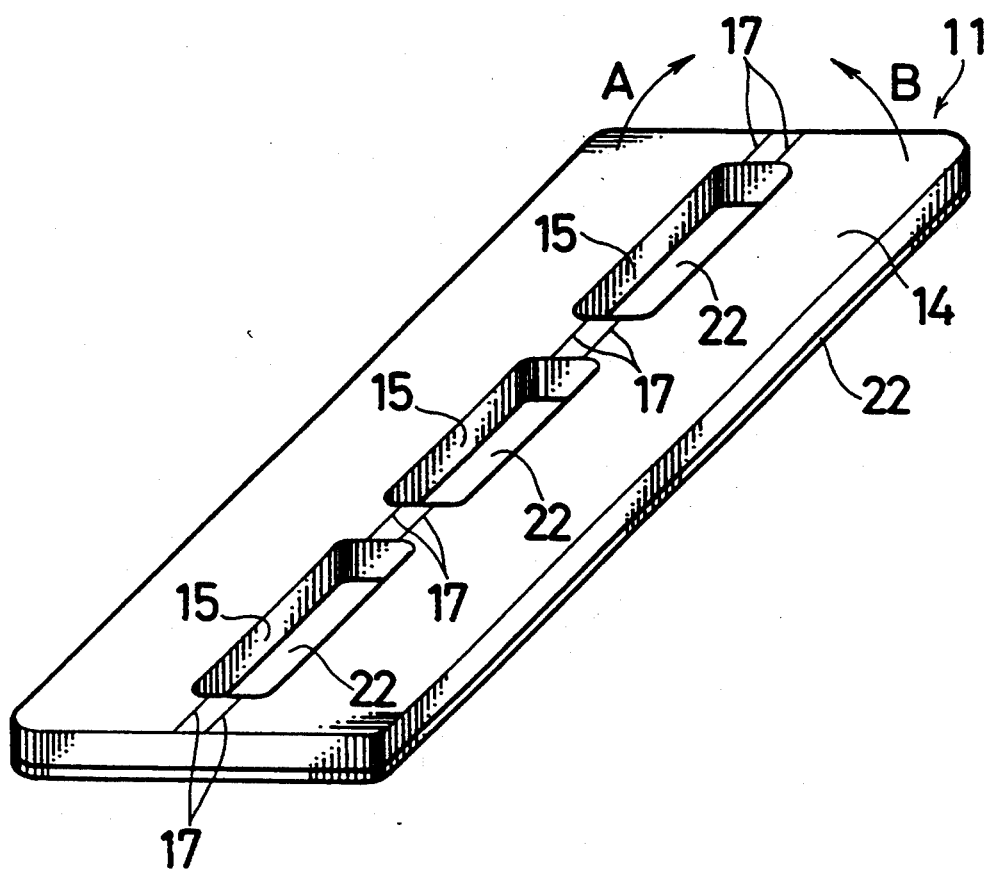
FIGS. 9 to 16 show a second embodiment of the present invention.
Figure 10:
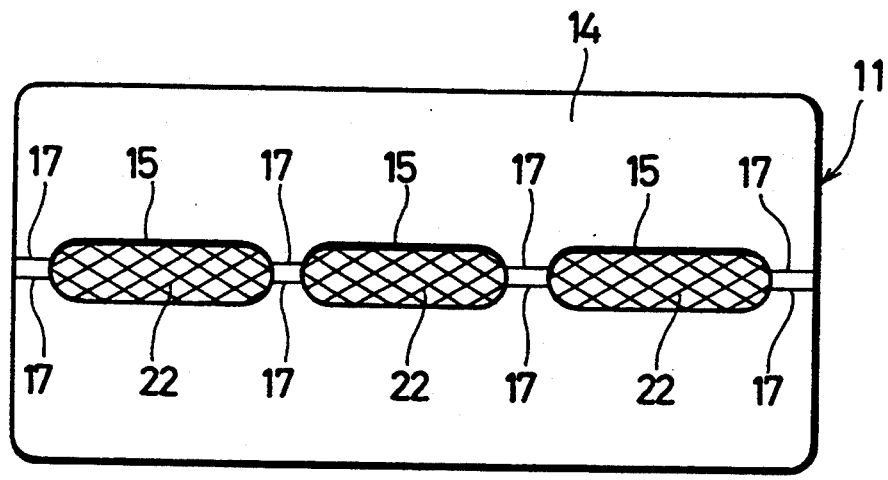

As shown in FIGS. 9 and 10, a plant container 11 of the present embodiment comprises a supporting panel 14 as supporting member. The supporting panel 14 is formed of, for example, an expanded polystyrene sheet and has a flat rectangular shape. Three cutaway sections 15 are formed in a central section along a longitudinal direction of the supporting panel 14. The cutaway sections 15 have been formed to allow roots developing from seeds to pass through the supporting panel 14 and reach a nutrient solution. The cutaway sections 15 and fold lines 17, described later, are pressed into the supporting panel 14 simultaneously during a manufacturing stage. A width of the cutaway sections 15 is set to be greater than a diameter of the seeds.

Moreover, the cutaway sections 15 need not be limited to three in number. That is, as long as the plant container 11 has a requisite strength to support the plants as they grow, one, two or more than three cutaway sections 15 may equally be provided.

The fold lines 17 are formed in the longitudinal direction on the supporting panel 14 so as to allow the plant container 11 to be bent in a predetermined shape. Further, the fold lines 17 are formed so as to pass over the cutaway sections 15.

Accordingly, when the plant container 11 is folded along the fold lines 17, a net-mesh shaped bonded-fiber fabric 22 (water retaining member) simultaneously folds. The bonded-fiber fabric 22, described later, is disposed under the cutaway sections 15.

Figure 11:
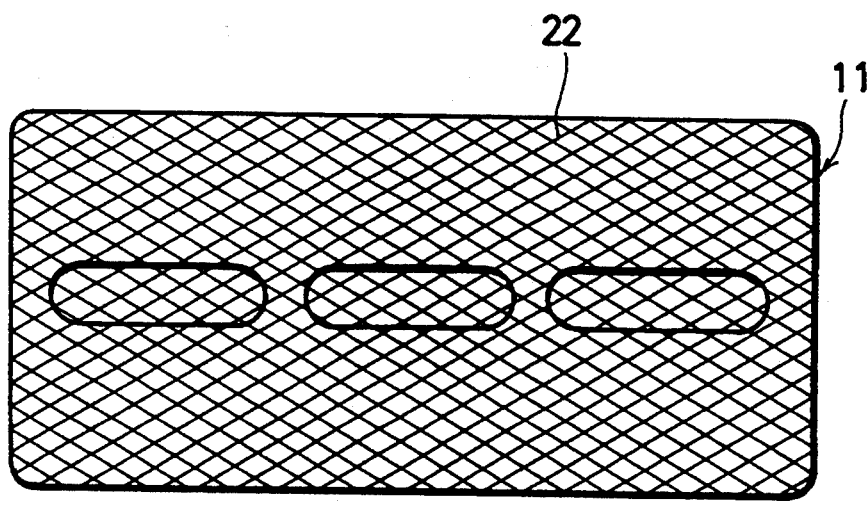
Figure 12:
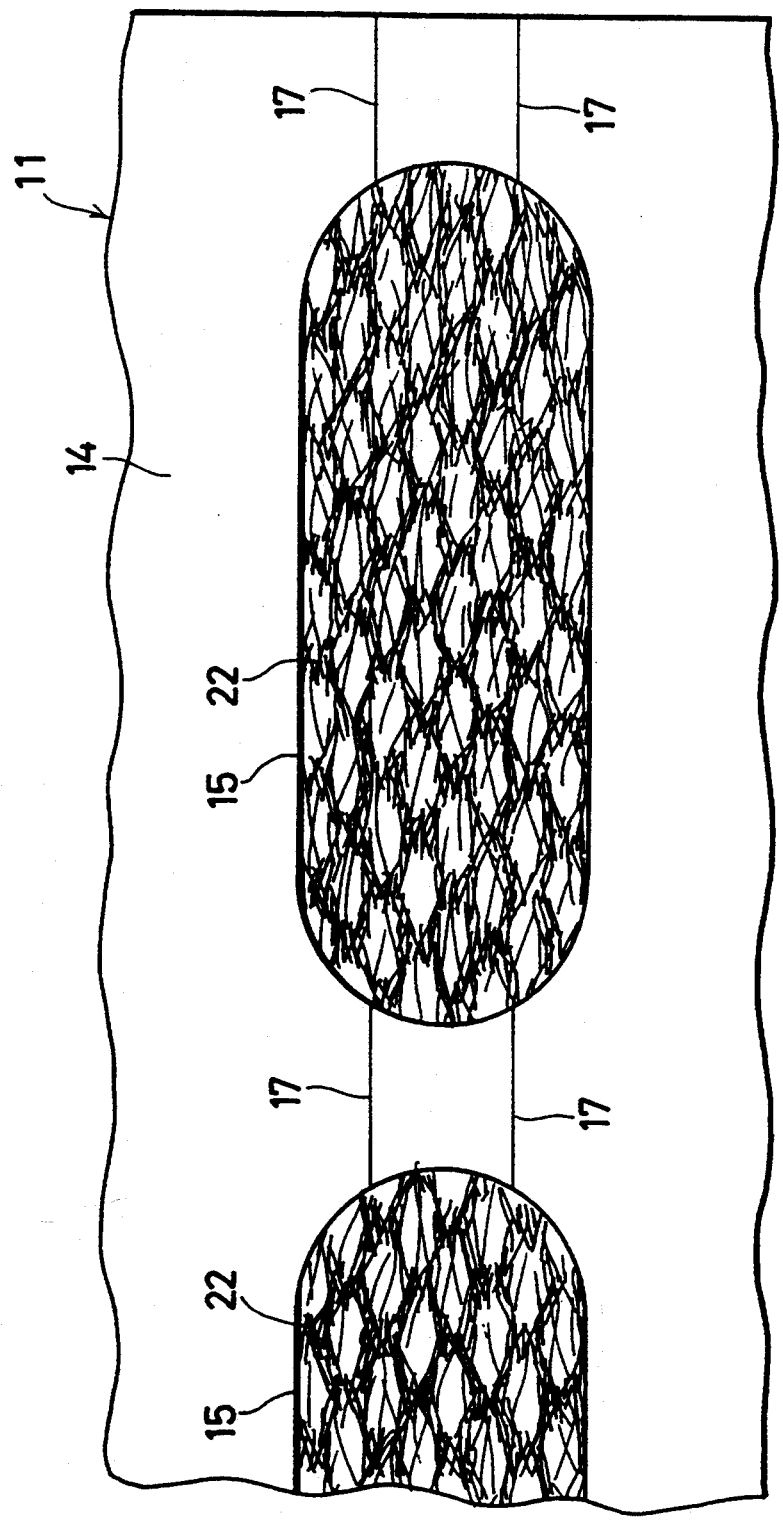
Figure 13:
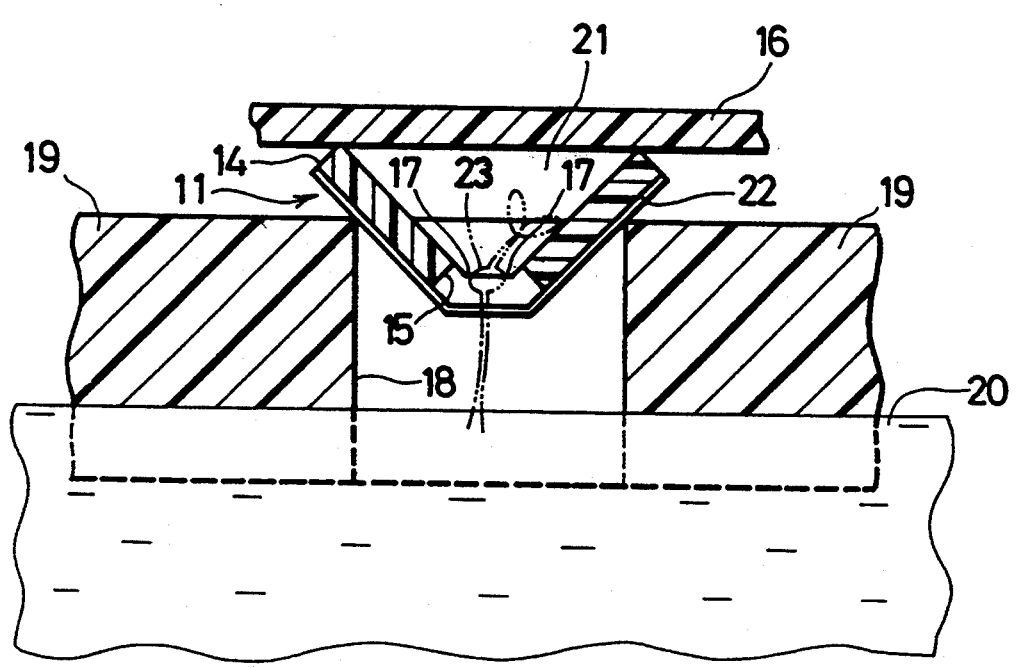

As shown in FIG. 11, the net-mesh shaped bonded-fiber fabric 22 is provided over an entire lower surface of the supporting panel 14 which has the cutaway sections 15 formed therein. The bonded-fiber fabric 22 is capable of supporting the seeds. As shown in FIG. 12, which is a partially enlarged plan view of the plant container 11, a surface density of the fiber of the bonded-fiber fabric 22 is not uniform and low density areas are distributed in the net-mesh. There are a plurality of gaps between the fibers. As shown in FIG. 13, roots of saplings 23 pass through the gaps. Moreover, the bonded-fiber fabric 22 is strong enough to prevent the saplings 23 from tearing through the bonded-fiber fabric 22 when the roots which have reached a nutrient solution 20 are pulled along by the flowing nutrient solution 20. Further, the bonded-fiber fabric 22 absorbs and collects water trickling down from the cutaway section 15, as will be described later, and releases the water drop by drop to the nutrient solution 20 when the collected water is in excess.

The net-shaped bonded-fiber fabric 22 need not be provided over the entire lower surface of the supporting panel 14, as long as the cutaway sections 15 are blocked.

As shown in FIG. 9, based on the above arrangement and in the case where the plant container 11 is used, the plant container 11 is bent in directions A and B along the fold lines 17. Accordingly, as shown in FIG. 13, the bonded-fiber fabric 22 provided under the cutaway section 15 also bends along with the supporting panel 14.

Then, seeds are soaked in the nutrient solution 20 for substantial 12 hours so that the seeds include a sufficient quantity of the nutrient solution 20. The seeds are then placed in the bent plant container 11. Here, the seeds that have been placed in plant container 11 are supported by the bonded-fiber fabric 22 since the width of the cutaway section 15 is greater than the diameter of the seeds.

Thereafter, each of the plant containers 11 is inserted into vertically oriented channels 18 which are provided in a raft 19. The raft 19 is then floated on the nutrient solution 20.

After this, a cover sheet 16 (raft cover) capable of water retention is placed over the plant containers 11 so as to provide humidity suitable for germination. The cover sheet 16 may, for example, be formed of resin having polyvinyl alcohol etc. which is capable of water retention, of thick bonded-fiber fabric or wadding paper or the like.

When the cover sheet 16 is placed over the plant containers 11, an air space 21 is formed between the cover sheet 16 and each of the plant containers 11. The air space 21 becomes permeated with water vapor from the nutrient solution 20 entering the air space 21 through the cutaway section 15. The water vapor is formed due to evaporation from the nutrient solution 20. Since the humidity of the air space 21 becomes higher due to the water vapor, the seeds grow in a high-humidity environment.

Moreover, since the humidity of the air space 21 increases, dew condensation of the water vapor occurs on a surface of the supporting panel 14 which faces the air space 21, and water droplets form on the surface of the supporting panel 14. The water droplets trickle down to the cutaway section 15 which is disposed in a base section of the supporting panel 14. Since the width of the cutaway section 15 is set to be greater than the diameter of the seeds, the water drops trickling downwards do not collect in the cutaway section 15 and are absorbed by the bonded-fiber fabric 22 provided under the cutaway section 15. The seeds contacting with the bonded-fiber fabric 22 absorb the water collected by the bonded-fiber fabric 22 as water necessary for growth.

On the other hand, if large quantities of the water droplets begin to trickle towards the cutaway section 15 and an amount of the water retained by the bonded-fiber fabric 22 becomes excessive, excess water falls drop by drop through the bonded-fiber fabric 22 into the nutrient solution 20. Accordingly, the bonded-fiber fabric 22 is normally capable of retaining a suitable quantity of water. This has the advantage of protecting the seeds placed on the bonded-fiber fabric 22 from possibly debilitating factors such as excessive humidity.

The roots of the saplings 23 penetrate the bonded-fiber fabric 22 and grow towards the nutrient solution 20. Here, since the net-mesh shaped bonded-fiber fabric 22 is being used, even in mid-summer or mid-winter, when a so-called germination force is weak, it is easy for the roots to grow through the plurality of gaps in the net-mesh shape as described earlier. A high percentage of root penetration can thereby be achieved.

Further, when the plant container 11 is folded along the fold lines 17, the net-mesh shaped bonded-fiber fabric 22 disposed under the cutaway sections 15 also folds. As a result, both lower parts and lateral parts of the seeds placed on the bonded-fiber fabric 22 contact with the bonded-fiber fabric 22. Accordingly, roots that develop in lateral directions from the seeds can also penetrate the bonded-fiber fabric 22 easily. A higher percentage of root penetration can thereby be achieved.

Figure 14:
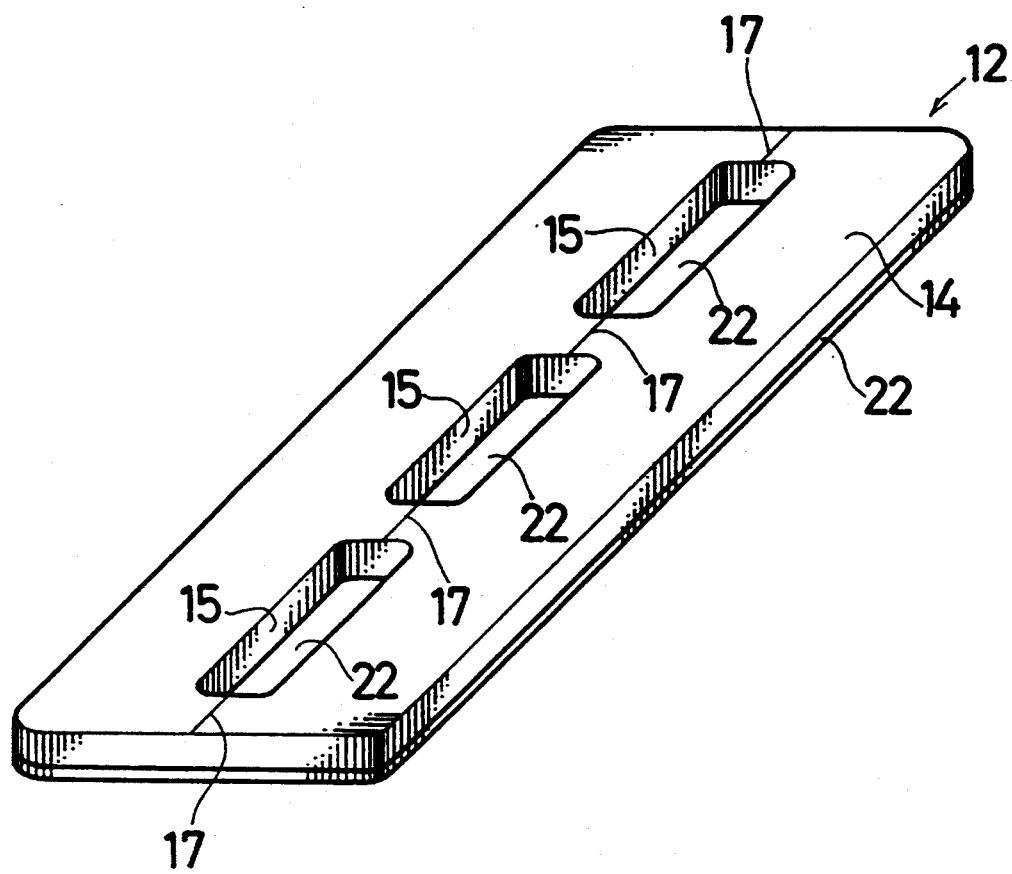
Figure 15:
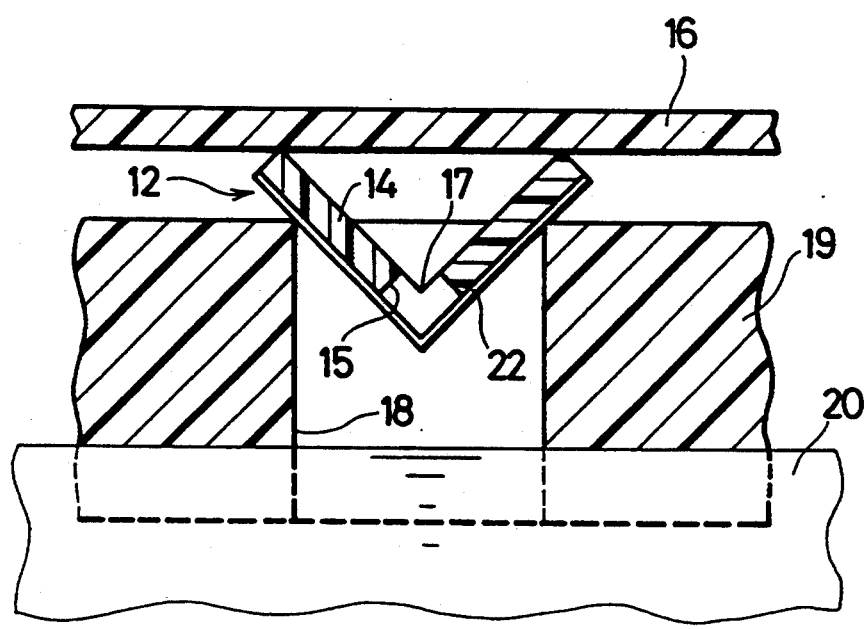

Moreover, the fold lines 17 may be formed so as to pass over the cutaway sections 15, or, as shown for example in FIG. 14, may be formed so as to pass coincidentally, i.e., as a single line, through a center of each of the cutaway sections 15. In this case, as shown in FIG. 15, when a plant container 12 is folded along a fold line 17, the seeds can be supported sufficiently by both lateral faces of the bonded-fiber fabric 22 since the bonded-fiber fabric 22 has a substantial V-shape in a sectional view.

Figure 16:
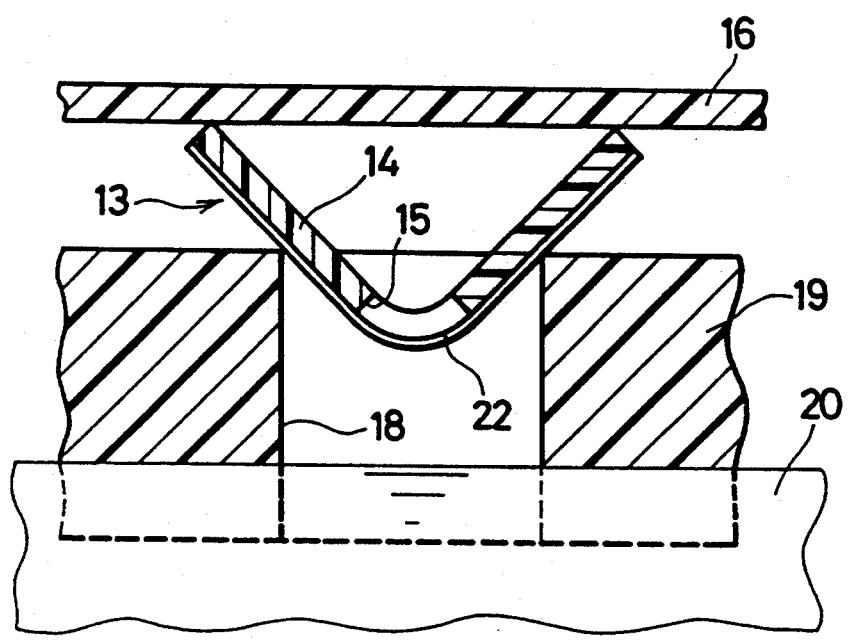

Furthermore, the fold lines 17 need not be formed on the supporting panel 14 at all. In this case, as shown in FIG. 16, when a plant container 13 is folded, it has a substantial U-shape in a sectional view. As a result, when the plant container 13 is inserted into a vertically oriented channel 18, the plant container 13 is supported sufficiently by a raft 19 due to the elastic force exerted by the plant container 13. Thus, when manufacturing the plant container 13, a step to form the fold lines 17 on the supporting panel 14, as shown in FIG. 9, becomes unnecessary and manufacturing cost of the plant container 13 can be reduced.

In the present embodiment the bonded-fiber fabric 22 is used as the water retaining member wherein the surface density of the fibers of the net-mesh shaped bonded-fiber fabric 22 is not uniform and low surface density areas are distributed in the net-mesh. However, a bonded-fiber fabric, which has a uniform surface density of fibers, or cheese cloth may equally be used, except during mid-summer or mid-winter when the germination force is weak. Moreover, porous material made of resin, such as polyurethane foam, having pores -extending continuously from an upper surface to an under surface may equally be used.

As described above, the plant container 11 of the present embodiment comprises: the supporting panel 14 (supporting member) which has the cutaway sections 15 formed thereon, the width of the cutaway sections 15 being greater than the diameter of the seeds; and the bonded-fiber fabric 22 disposed on the lower surface of the supporting panel 14 so as to block the cutaway sections 15 and so as to permit the roots of the saplings to pass through.

Accordingly, the bonded-fiber fabric 22 is normally capable of retaining a suitable quantity of water. This has the advantage of protecting the seeds placed on the bonded-fiber fabric 22 from possibly debilitating factors such as excessive humidity.

Further, by using the net-mesh shaped bonded-fiber fabric 22, even in mid-summer or mid-winter, when the so-called germination force is weak, it is easy for the roots to grow through the plurality of gaps in the net-mesh shape. A high percentage of root penetration can thereby be achieved.

A third embodiment of the present invention is described hereinbelow, referring to FIGS. 17 to 22.

The present embodiment relates to a raft that is an improvement over the raft 4 described in the first embodiment, and a raft cover that provides a better growing environment for plants than does the cover sheet 16 described earlier in the second embodiment.

Figure 17:
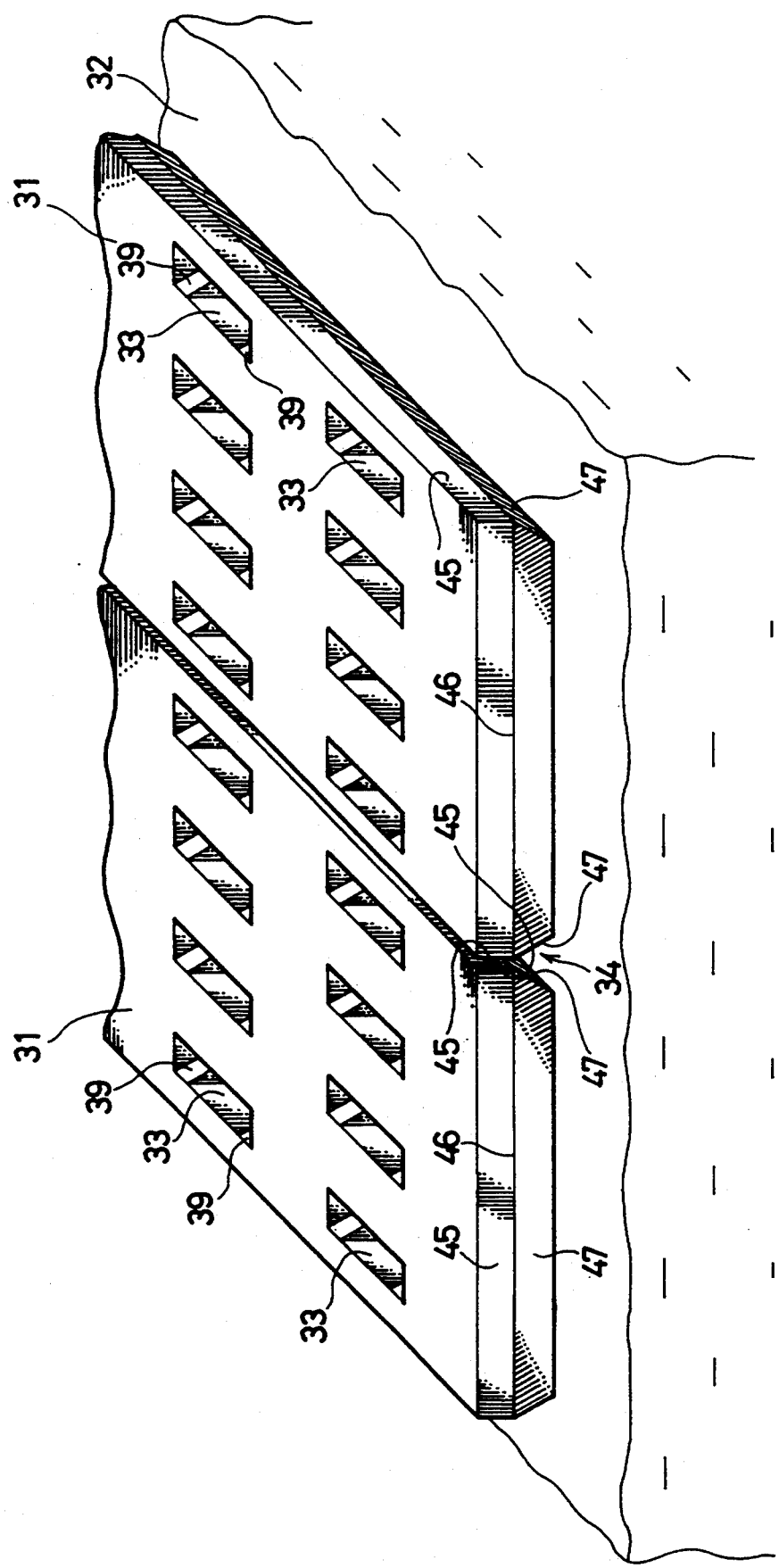
FIGS. 17 to 22 show a third embodiment of the present invention.
Figure 18:
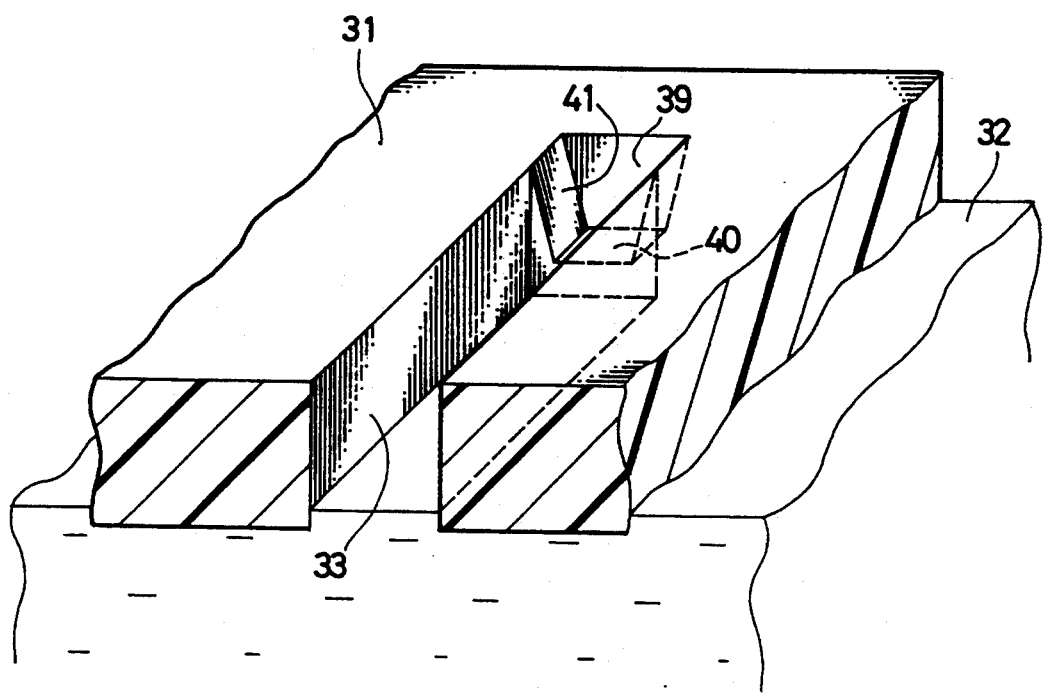
Figure 19:
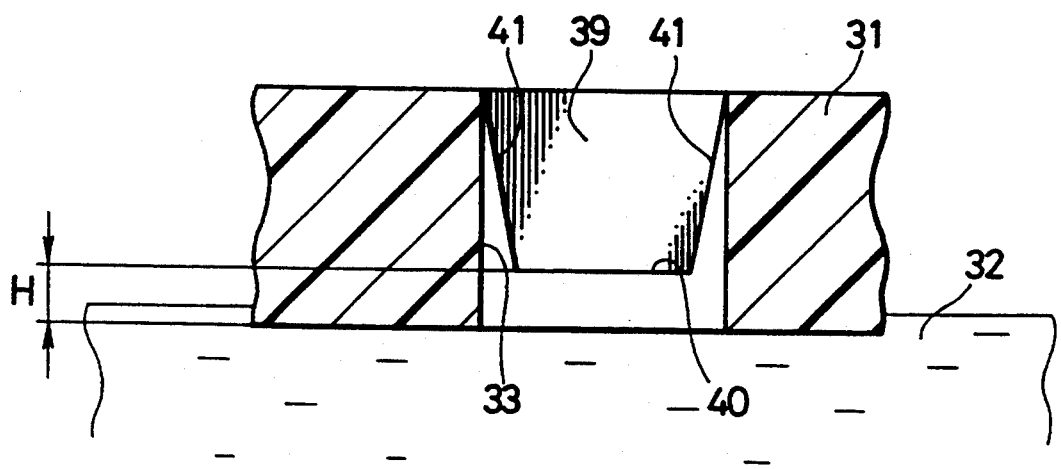
Figure 21:
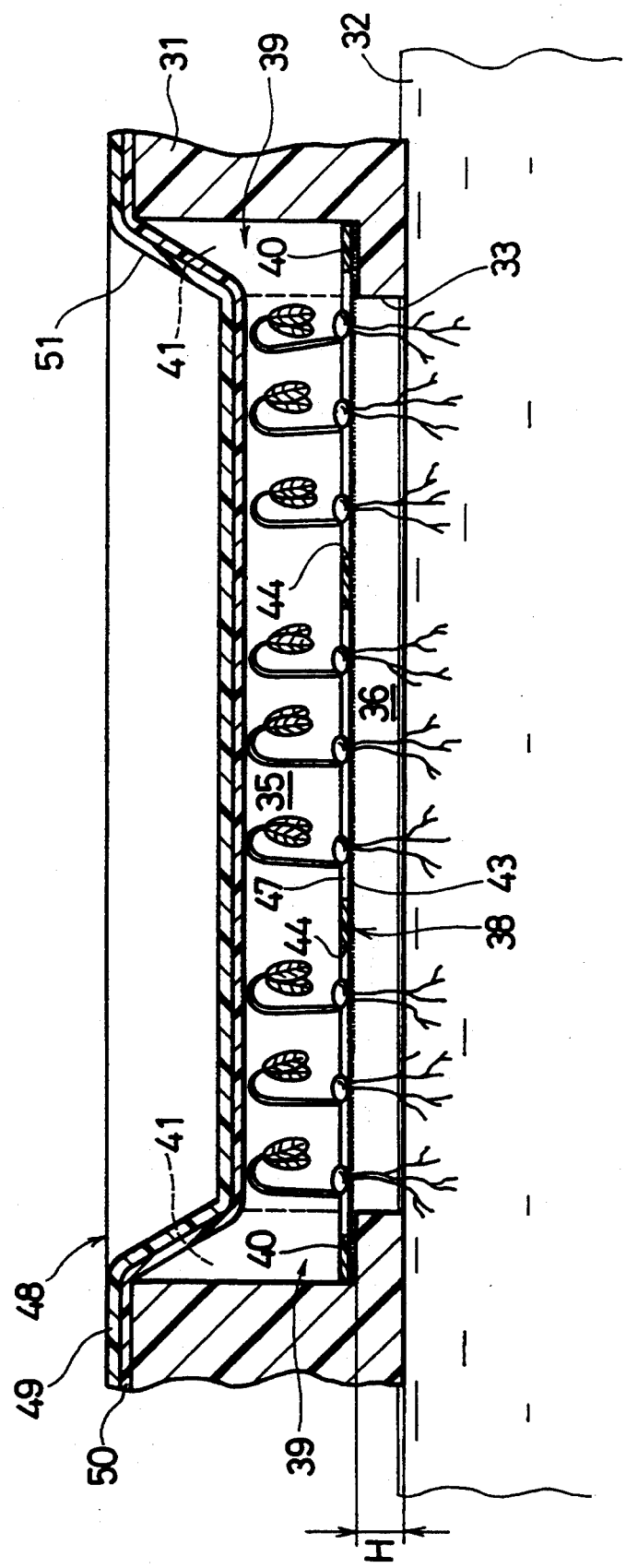
Figure 22:
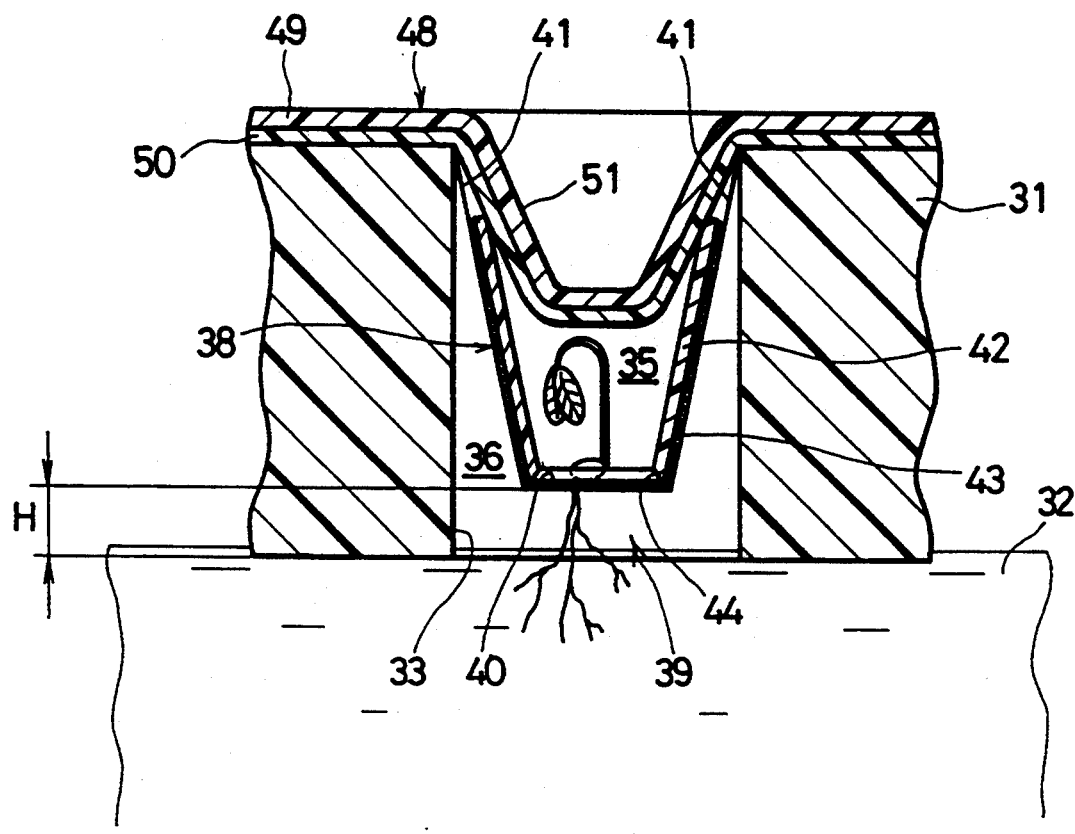

A raft 31 of the present embodiment is formed into a flat shape from, for example, plastics such as expanded polystyrene. As shown in FIG. 17, the raft 31 comprises a plurality of vertically oriented channels 33 which support plant containers, described later. As shown in FIGS. 18 and 19, each of the vertically oriented channels 33 extends continuously from an upper surface to an under surface of the raft 31. As a result, roots of plants supported by the plant containers reach a nutrient solution 32 through the vertically oriented channels 33. Further, supporting sections 39 are formed at extreme ends in a longitudinal direction of each of the vertically oriented channels 33. As shown in FIGS. 21 and 22, each of the supporting sections 39 comprises a base surface section 40 which contacts with a base surface of a plant container 38 and side surface sections 41 which contact with outer side surfaces of the plant container 38.

As shown in FIG. 22, a width of the base surface section 40 is formed to be less than a width of the vertically oriented channel 33. The side surface sections 41 which rise up slopingly from both extreme edges of the base surface section 40 are formed so that a width between the side surface sections 41 at the upper surface of the raft 31 is the same as the width of the vertically oriented channel 33. Accordingly, the plant container 38 is firmly supported by the supporting sections 39, since the base surface of the plant container 38 is supported by the base surface sections 40 of each of the supporting sections 39 and the two outer side surfaces of the plant container 38 are supported by the side surface sections 41.

A height H of each of the base surface sections 40, i.e., a distance between an under surface of the raft 31 and each of the base surface sections 40, is set so that the nutrient solution 32 does not contact with the base surface sections 40 located above the nutrient solution 32 when, as shown in FIGS. 19 and 21, the raft 31 becomes partly submerged in the nutrient solution 32 due to the weight of grown plants. Since an air space section 36 forms between the plant container 38 and the nutrient solution 32, direct water supply from the nutrient solution 32 to the plant container 38 due to mutual contact between the nutrient solution 32 and the plant container 38 is thereby prevented.

As shown in FIGS. 21 and 22, the plant container 38 is supported by the base surface sections 40 and the side surface sections 41. The plant container 38 comprises a supporting member 42 formed of expanded polystyrene sheet etc., and a water retaining member 43 disposed on an under surface of the supporting member 42 and composed of bonded-fiber fabric etc. A plurality of cutaway sections 44 are formed in the supporting member 42, the cutaway sections 44 permitting roots of plants to pass through and enter the nutrient solution 32. Specifically, the plant container 11 (FIG. 11) described earlier in the second embodiment may, for example, be used.

Figure 20:
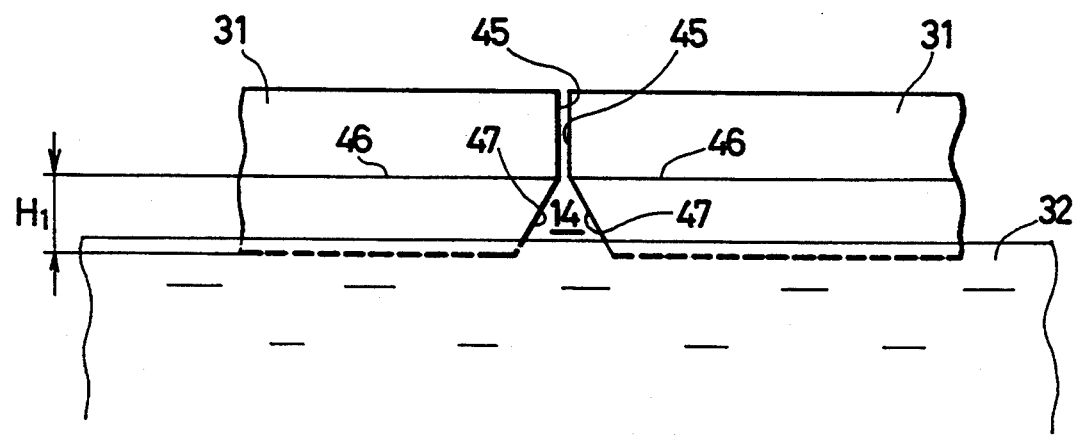

Further, as shown in FIGS. 17 and 20, all along side surfaces of each of the rafts 31 are formed: upper side surface sections 45 that mutually contact in the adjacent rafts 31; and lower inclined-surface sections 47 that prevent the nutrient solution 32 from rising due to the occurrence of the capillary phenomenon along the sections of the adjacent rafts 31 that are mutually contacting.

The upper side surface sections 45 are formed perpendicular with respect to the upper surface of the raft 31 and have a fixed length. On the other hand, the lower inclined-surface sections 47 are formed so as to incline from lower edge sections 46 of the upper side surface sections 45 in an inward direction towards and up to the under surface of the raft 31. Accordingly, the rafts 31 mutually contact only at the upper side surface sections 45 and an air space section 34 forms between the lower inclined-surface sections 47 and the nutrient solution 32.

A height $H_1$ of each of the lower inclined-surface sections 47, i.e., a distance between the lower edge sections 46 of each of the upper side surface sections 45 and the under surface of the raft 31, is set so that the lower edge sections 46 of the upper side surface sections 45 do not touch the nutrient solution 32 when the rafts 31 partly submerge in the nutrient solution 32 due to the weight of the grown plants. Consequently, the air space section 34 thereby formed prevents the rise of the nutrient solution 32 due to the capillary phenomenon along the adjacent rafts 31. Accordingly, direct water supply from an upper surface of the raft 31 to the plant container 38 is prevented, since the nutrient solution 32 no longer collects on the upper surface of the raft 31.

Further, as shown in FIGS. 21 and 22, a raft cover 48 which covers the raft 31 promotes the growth of the plants. The raft cover 48 comprises a cover body 49 and a water retaining member 50 which is adhered to an inner surface of the cover body 49. The inner surface of the cover body 49 faces towards the raft 31. The raft cover 48 has a degree of transparency that is just sufficient to permit a small amount of sunlight or other light to pass through. The cover body 49 is formed, for example, from expanded polystyrene etc., and the water retaining member 50 is formed, for example, from bonded-fiber fabric, cheese cloth or polyurethane foam etc. Moreover, although it is desirable that the water retaining member 50 be adhered to the cover body 49, the water retaining member 50 is not indispensable to the raft cover 48 and the raft cover 48 may equally comprise only the cover body 49.

A weight of the raft cover 48 is set as described hereinbelow. The raft cover 48 is set to be sufficiently heavy to prevent the raft cover 48 from being pushed upwards due to a force exerted upwards when roots of the plants begin to pass through the plant containers 38 and grow towards the nutrient solution 32; and sufficiently light so that the raft cover 48 can be pushed upwards due to a force exerted by the plants as they grow upwards after the roots of the plants have reached the nutrient solution 32 and have developed to a certain extent. According to this arrangement, the extent of plant growth that has taken place in the plant Containers 38 can be determined by confirming whether the raft cover 48 is contacting with the raft 31 or not.

Projecting sections 51 are integrally formed in the raft cover 48 so as to loosely fit into the vertically oriented channels 33 of the raft 31. The projecting sections 51 are formed so that, when the projecting sections 51 are loosely fitted into each of the vertically oriented channels 33, a base section of each of the projecting sections 51 is located higher than the base surface of each of the plant containers 38 previously inserted in the vertically oriented channels 33. Accordingly, when the projecting sections 51 are loosely fitted into the vertically oriented channels 33 of the rafts 31, air space sections 35 form in upper sections of the plant containers 38 which have been previously inserted into the raft 31.

With the above arrangement, when water culture is to be carried out, plant seeds are sown into each of the plant containers 38. Then, each of the plant containers 38 is inserted into each of the vertically oriented channels 33 of the raft 31. Here, the base surface of each of the plant containers 38 contacts with the base surface sections 40 of each of the vertically oriented channels 33 in the raft 31 and the two side surfaces of each of the plant containers 38 contact with the side surface sections 41 of each of the vertically oriented channels 33. Accordingly, the plant containers 38 are stably supported by the raft 31. Further, position setting of the plant containers 38 in a vertical direction is easily effected since the base surfaces of the plant containers 38 contact with the base surface sections 40 of the vertically oriented channels 33 in the raft 31. That is, due to the height H of the base surface sections 40, in other words, due to the distance between the base surface sections 40 and the under surface of the raft 31, the position of each of the plant containers 38 is easily set so that the base surfaces of the plant containers 38 do not touch the nutrient solution 32. Then, the raft 31 is covered with the raft cover 48, causing the air space sections 35 to be formed. The raft 31 is then floated on the nutrient solution 32, causing the air space sections 36 to form between the plant containers 38 and the nutrient solution 32.

Water vapor forms in each of the air space sections 36 due to evaporation from the nutrient solution 32. The water vapor then passes through the cutaway sections 44 of the plant containers 38 and collects in the air space sections 35 formed by the projecting sections 51 of the raft cover 48 and the plant containers 38. The collected water vapor condenses into water droplets on an inner surface of the raft cover 48 and on wall sections of the plant containers 38.

The condensed water droplets on the inner surface of the raft cover 48 are retained by the water retaining member 50. On the other hand, the water droplets that have condensed on the wall sections of the plant containers 38 reach the base surfaces of the plant containers 38 by trickling down the wall sections. These water droplets are retained by the water retaining member 43 disposed under the base surfaces of the plant containers 38. In this way, a humid environment suitable for plant growth can be provided in the air space section 35 using water vapor which evaporates from the nutrient solution 32.

Since roots generally grow towards darkness, roots developing in the air space sections 35 grow in a direction opposing to the raft cover 48. This is because the raft cover 48 has a degree of transparency that is just sufficient to permit a small amount of sunlight or other light to pass through. Consequently, the roots pass through the cutaway sections 44 and the water retaining member 43 located under the cutaway sections 44 of the plant containers 38 and grow towards the nutrient solution 32. However, it can happen that the roots grow towards the supporting member 42, or that the roots grow towards the water retaining member 43 but cannot pass through the plant container 38 sufficiently. In such a case, the plant may be pushed upwards as the roots grow.

In this case, the plant that has been pushed upwards contacts with the projecting section 51 of the raft cover 48 and exerts an upward force against the projecting section 51. However, the raft cover 48 pushes the plant downward because the weight of the raft cover 48 is set to be sufficiently heavy to prevent the raft cover 48 from being pushed upwards due to the upward force exerted by the plant when the roots of the plant begin to grow. Consequently, since the raft cover 48 pushes the plant downward, the roots can sufficiently pass through the plant container 38 and reach the nutrient solution 32.

When the roots reach the nutrient solution 32, growth of stalks and foliage is accelerated. The weight of the raft cover 48 is set to be sufficiently light so that the raft cover 48 is pushed upwards due to the upward force exerted by the plants that have grown to a certain extent. Consequently, it is possible to confirm the state of growth of the plants, i.e., whether or not the roots have reached the nutrient solution 32, by determining whether the raft cover 48 and the raft 31 are contacting with each other. Then, based on the confirmation, the raft cover 48 is removed from the raft 31 and, subsequently, cultivation of the plants is continued in the plant containers 38 until the plants have grown to the shipping stage.

The weight of the plants increases as the plants grow. The weight of the raft 31 that holds the plants also increases due to the increase in the weight of the plants. As the result, the amount by which the raft 31 partly submerges into the nutrient solution 32 gradually increases from an initial substantial 2-3 mm. The plants are contained in the plant containers 38 which are supported by the supporting sections 39. The base surface sections 40 of the supporting sections 39 are set at the height H so that the nutrient solution 32 does not contact with the base surface sections 40 when the raft 31 partly submerges into the nutrient solution 32 due to the increased weight of the growing plants. Consequently, direct water supply from the nutrient solution 32 to the plant containers 38 is prevented since the plant containers 38 do not get submerged in the nutrient solution 32 during cultivation.

As described above, when water culture is carried out using the raft 31 and the raft cover 48 related to the present embodiment, the water supply to the plant containers 38 is carried out indirectly by the rise of the water vapor from the nutrient solution 32 via the air space sections 36. Consequently, excess water supply to the plant containers 38 can be prevented and thereby a favorable growing environment can be maintained for the plants.

Moreover, in the present embodiment, contact between the plant containers 38 and the nutrient solution 32 has been described as being prevented by supporting the plant containers 38 by the base surface sections 40 which are disposed at the height H. However, the specific configuration can be varied as long as the air space sections 36 are formed between the plant containers 38 inserted in the vertically oriented channels 33 and the nutrient solution 32.

As described above, the raft 31 of the present embodiment has a configuration wherein the air space sections 36 are formed between the nutrient solution 32 and the plant containers 38 inserted in the vertically oriented channels 33.

As a result, excess water supply to the plant containers 38 can be prevented and a favorable growing environment provided for the plants, since the water supply is carried out to the plant containers 38 indirectly, via the air space sections 36.

Further, in the present embodiment, the projecting sections 51 formed on the raft cover 48 fit into the vertically oriented channels 33 when the raft cover 48 is placed over the raft 31. The projecting sections 51 are designed to be located above the plant containers 38 which have been previously inserted in the vertically oriented channels 33.

Accordingly, the air space sections 35 are formed between the plant containers 38 and the projecting sections 51 of the raft cover 48. The water vapor collects in the air space sections 35, thereby providing a suitable environment for the growth of the plants. Moreover, due to the projecting sections 51, mutual positioning of the raft 31 and the raft cover 48 can be done easily.

The raft cover 48 is set to be sufficiently heavy to prevent the raft cover 48 from being pushed upwards due to the force exerted upwards when the roots of the plants begin to pass through the plant containers 38 and grow towards the nutrient solution 32; and sufficiently light to be capable of being pushed upwards due to the force exerted by the plants as they grow upwards after the roots of the plants have reached the nutrient solution 32 and have developed to a certain extent. Consequently, the roots of the plants can pass through the plant containers 38 more easily and the extent of plant growth that has taken place in the plant containers 38 can be determined by confirming whether the raft cover 48 is touching the raft 31 or not. It can thereby easily be determined when to remove the raft cover 48.

A fourth embodiment of the present invention is described hereinbelow, referring to FIGS. 23 to 28.

The present embodiment relates to a raft that is an improvement over the raft 31 described in the third embodiment.

Figure 23:
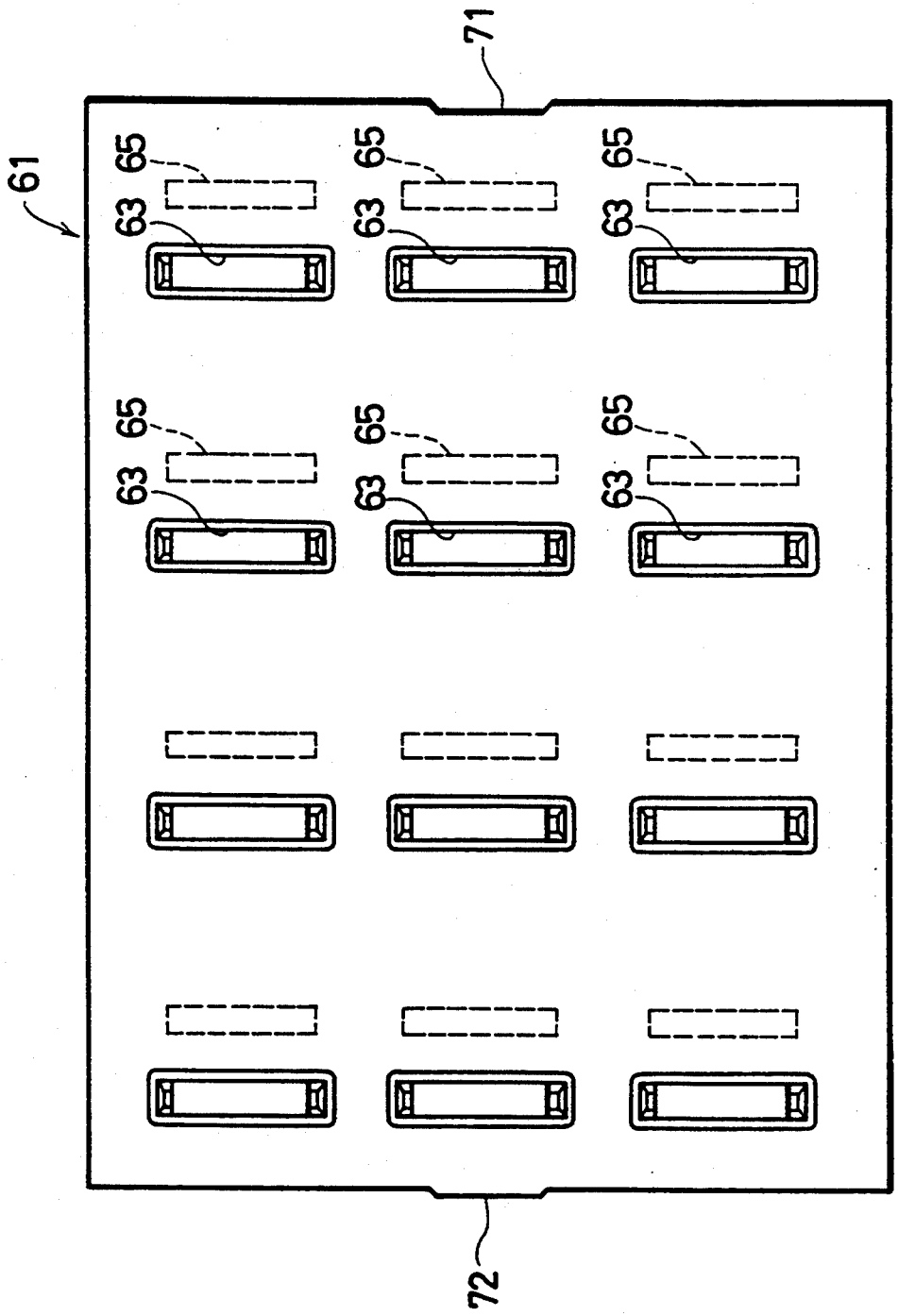
FIGS. 23 to 29 show a fourth embodiment of the present invention.

As shown in a plan view in FIG. 23, a raft 61 of the present embodiment is formed of, for example, expanded polystyrene etc. The raft 61 has a plurality of vertically oriented channels 63. Plant containers which support and nurture plants are inserted into the vertically oriented channels 63. Further, lower protruding sections 65 are disposed on an under surface of the raft 61. The lower protruding sections 65 are equal in number to the vertically oriented channels 63.

The vertically oriented channels 63 are arrayed at a fixed pitch on the raft 61. The lower protruding sections 65 are arrayed on the under surface of the raft 61 at the same pitch as the vertically oriented channels 63. Further, the lower protruding sections 65 are arrayed so that when the raft 61 is rotated horizontally by 180°, a position of each of the lower protruding sections 65 corresponds to a position of each of the vertically oriented channels 63 before rotation.

Figure 24:
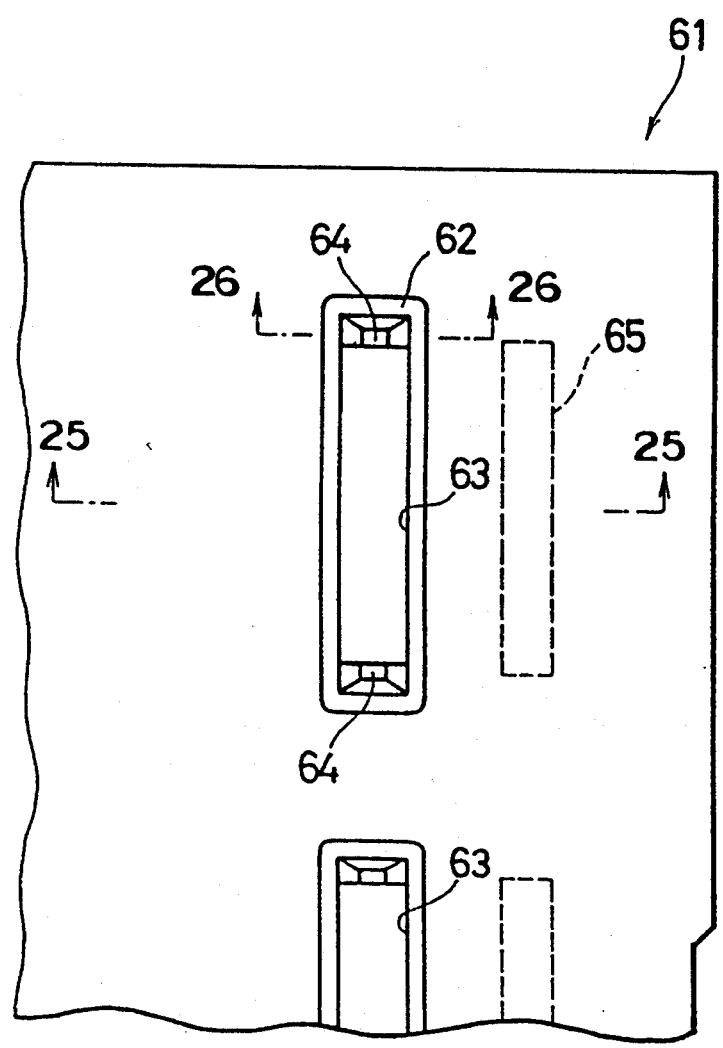
Figure 25:
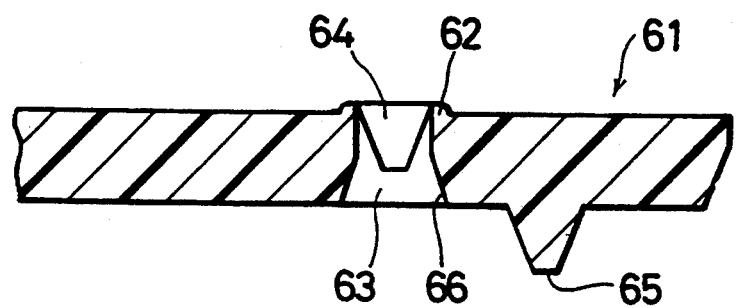
Figure 26:
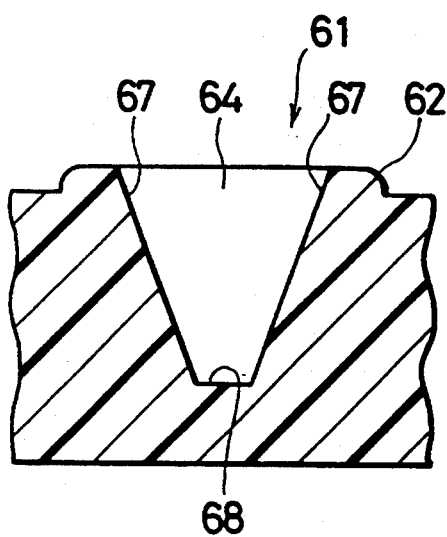

An enlarged view of the vertically oriented channel 63 is shown in FIG. 24. FIG. 25 shows a cross-section view of the raft 61 taken in the direction of the arrows substantially along an arcuate line C—C of the vertically oriented channel 63 shown in FIG. 24. FIG. 26 shows a cross-section view of the raft 61 taken in the direction of the arrows substantially along an arcuate line D—D of the vertically oriented channel 63 shown in FIG. 24.

As shown in FIG. 25, the vertically oriented channel 63 passes through the raft 61 from an upper surface to the under surface thereof. Roots of the plant supported by the plant container enter a nutrient solution via the vertically oriented channel 63.

An upper portion of the vertically oriented channel 63 is formed to be at a right angle to the upper surface of the raft 61. A lower portion 66 of the vertically oriented channel 63 is formed so as to become wider as it approaches the under surface of the raft 61.

Supporting sections 64 are provided on extreme ends in a longitudinal direction of the vertically oriented channel 63. The supporting sections 64 support the plant container when it is inserted into the vertically oriented channel 63. As shown in FIG. 26, the supporting section 64 comprises a base surface section 68 which contacts with a base surface of the plant container and side surface sections 67 which contact with side surfaces of the plant container.

An upper protruding section 62 is provided along a periphery of the vertically oriented channel 63. The upper protruding section 62 serves to prevent excess water from flowing into the plant container from a vicinity of the vertically oriented channel 63, the excess water having collected on the surface of the raft 61 due to water sprinkling etc. after sowing seeds.

Figure 27:
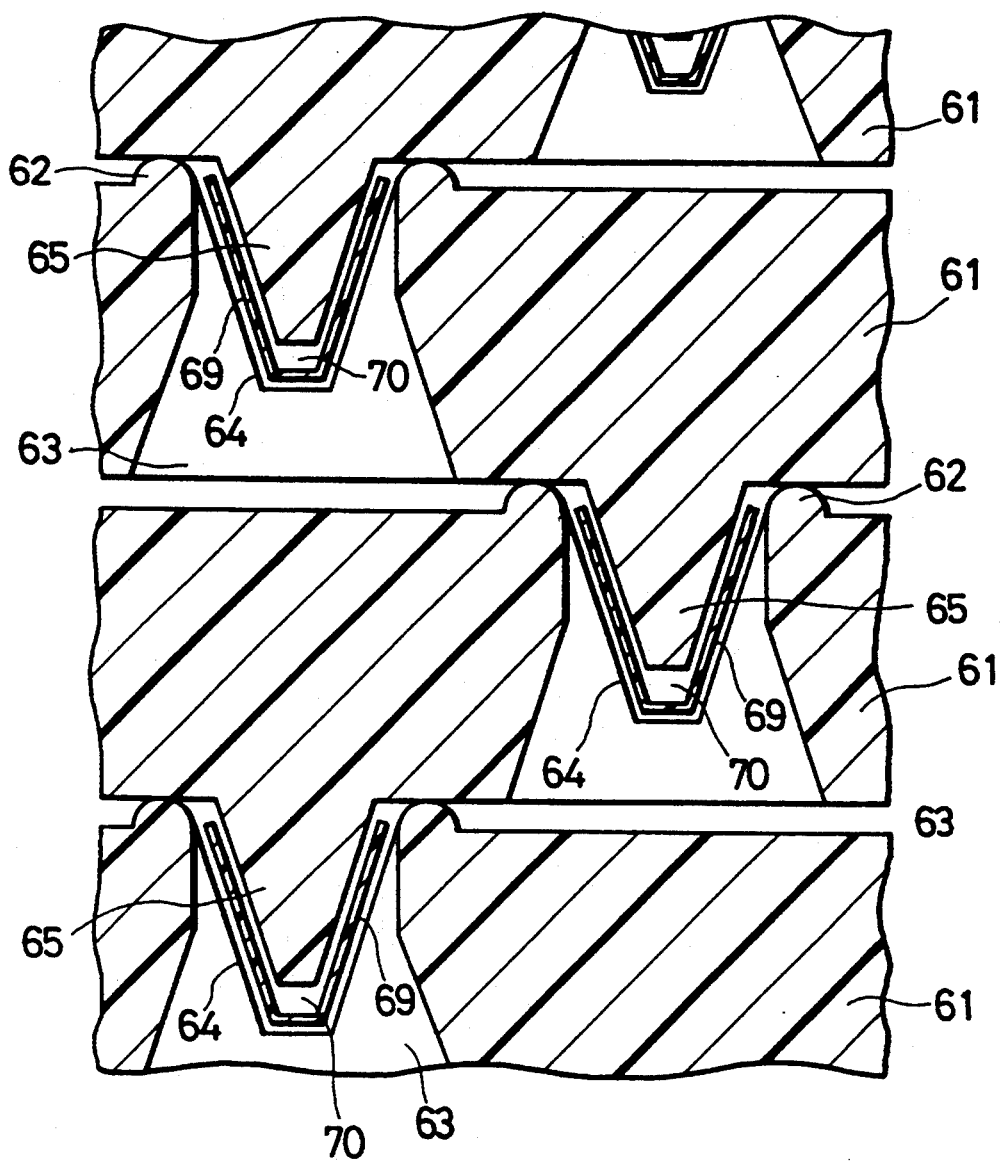

Further, the lower protruding sections 65 (FIG. 25) which are equal in number to the vertically oriented channels 63 are disposed on the under surface of the raft 61, as described above. As shown in FIG. 27, when the rafts 61 are rotated relative to each other by 180° and piled up, the lower protruding sections 65 of the overlying rafts 61 loosely fit into the vertically oriented channels 63 of the underlying rafts 61. Heights of the upper protruding sections 62 and the lower protruding sections 65 of the rafts 61 are set so that a gap 70 is formed between a base section of each of the lower protruding sections 65 and plant containers 69 previously inserted in each of the vertically oriented channels 63. The gap 70 is set to be slightly greater than a diameter of a seed.

A trapezoid shaped concave section 71 is provided on one of lateral side surfaces of each of the rafts 61 (FIG. 23). A convex section 72 is provided on another of the lateral side surfaces so as to fit into the concave section 71.

When water culture is carried out with the above arrangement, first the plant containers 69 are inserted into the vertically oriented channels 63 of the raft 61.

The plant containers 69 are made of water retaining material such as bonded-fiber fabric. Each of the plant containers 69 is supported by the side surface sections 67 (FIG. 26) and the base surface sections 68 when the plant containers 69 are inserted into the vertically oriented channels 63. Specifically, the plant container 11 (FIG. 11) described earlier in the second embodiment may, for example, be used as the plant container 69.

Sowing is performed in each of the plant containers 69 which have been previously inserted in the raft 61. Then, water sprinkling is performed in order to induce germination. During the water sprinkling, excess water falls on the raft 61. However, this water is kept in check by the upper protruding sections 62 which are disposed along the periphery of each of the vertically oriented channels 63. That is, the water is prevented from flowing into the plant containers 69 inserted in each of the vertically oriented channels 63. Consequently, over-humidity of the seeds due to excess inflow of water, movement of the seeds from a fixed position and so on are avoided and the germination ratio improves.

After sprinkling water, as shown in FIG. 27, the rafts 61 are rotated relative to each other by 180° and piled up. Accordingly, the lower protruding sections 65 of the overlying rafts 61 fit into the vertically oriented channels 63 of the underlying rafts 61. Then, the piled up rafts 61 are placed in suitable temperature and humidity conditions in order to accelerate the germination process. Here, the gaps 70, which are slightly greater than a diameter of a seed, are formed between the base sections of the lower protruding sections 65 and the plant containers 69 previously inserted in the vertically oriented channels 63. Consequently, each of the lower protruding sections 65 serves as a mudcap. That is, the seeds, which have been sown in the plant containers 69 inserted in the vertically oriented channels 63, are prevented from moving by the lower protruding sections 65. As a result, the movement of the seeds during germination due to a reaction of the growing roots is prevented and an abnormal development of the roots thereby does not occur.

Further, when the rafts 61 are piled up, a gap is formed between a surface of the underlying raft 61 and each of the plant containers 69 in the overlying raft 61 since the upper protruding sections 62 are provided along the periphery of each of the vertically oriented channels 63. The gap is larger than in a case where the upper protruding sections 62 are not provided. As a result, roots that develop during germination do not contact with the surface of the underlying raft 61. Accordingly, damage to the roots when the rafts 61 are piled up is prevented.

Figure 28:
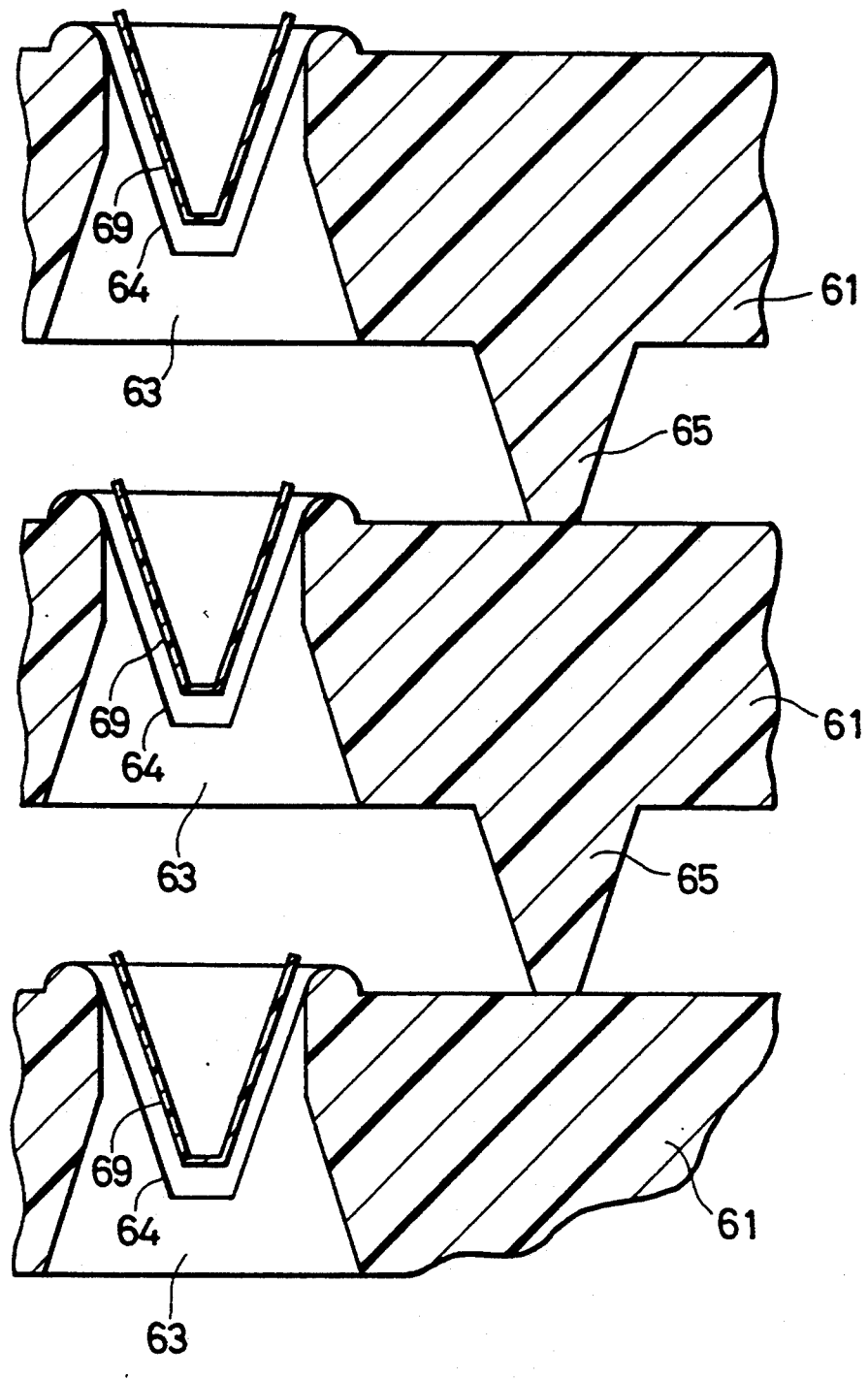

The seeds are sufficiently supported by the plant containers 69 and become immobile after germination has taken place and the roots have grown to a certain extent and have passed through the plant containers 69. At this stage the rafts 61 are piled up in a different way, as shown in FIG. 28. That is, the rafts 61 are piled up unidirectionally, without being rotated relative to each other by 180°. Accordingly, the lower protruding sections 65 function as spacers for providing the gaps between the adjacent rafts 61 and thereby prevent the grown roots from being damaged due to contact with the underlying raft 61.

Figure 29:
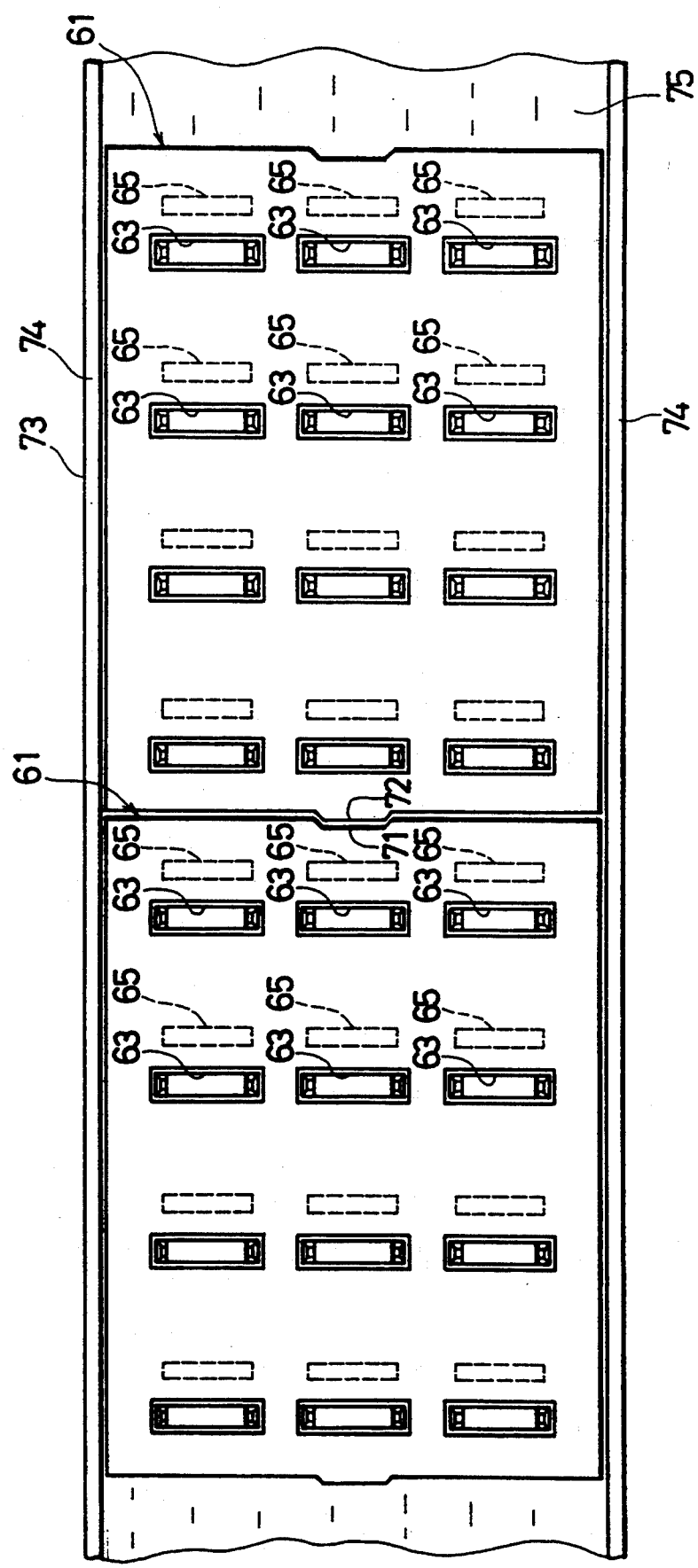
Figure 30:
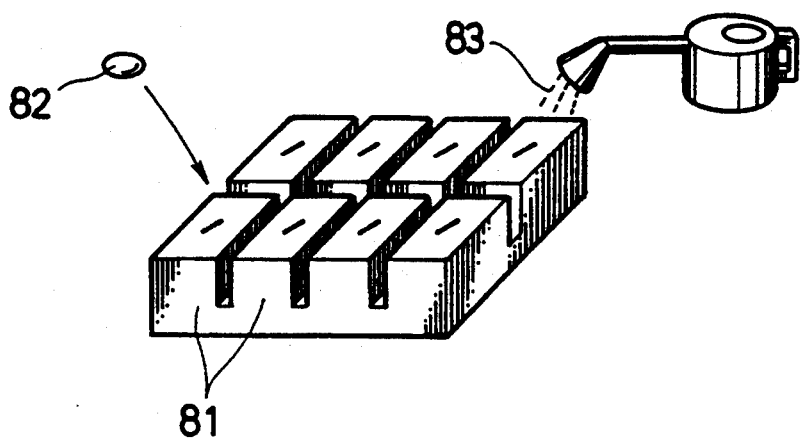
FIGS. 30 to 37 show a conventional example.
Figure 31:
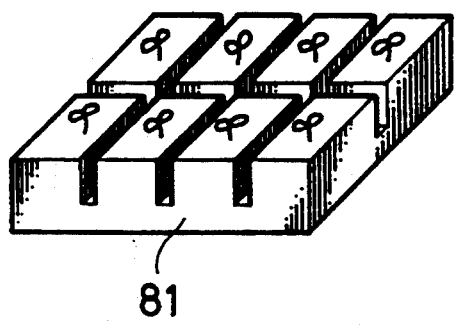
Figure 32:
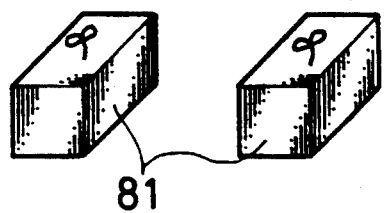
Figure 33:
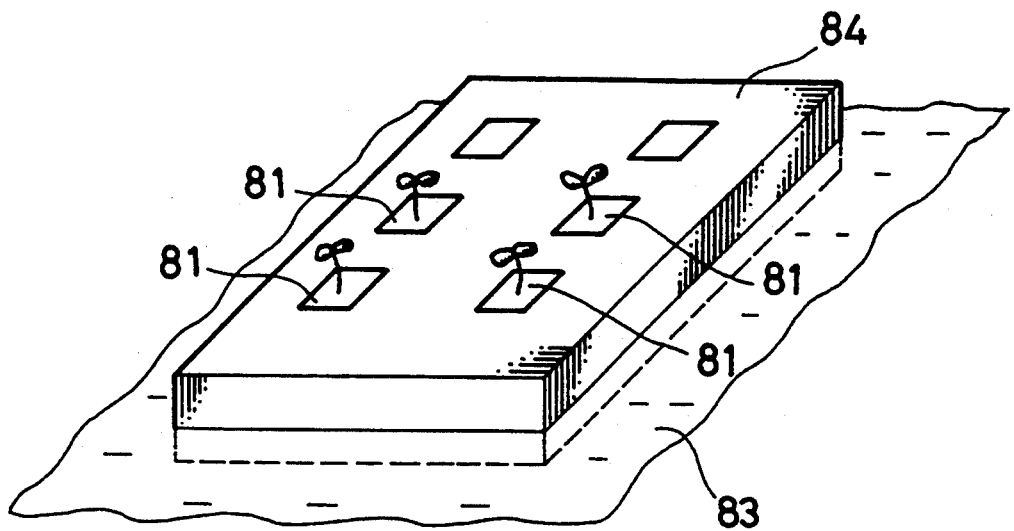
Figure 34:
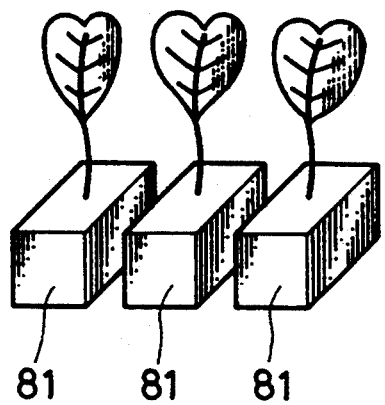
Figure 35:
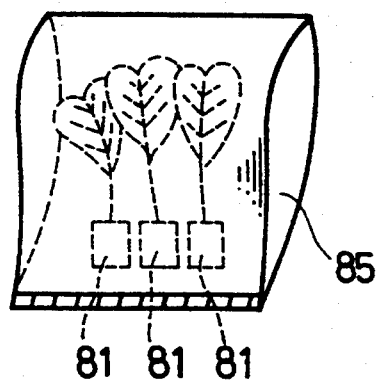
Figure 36:
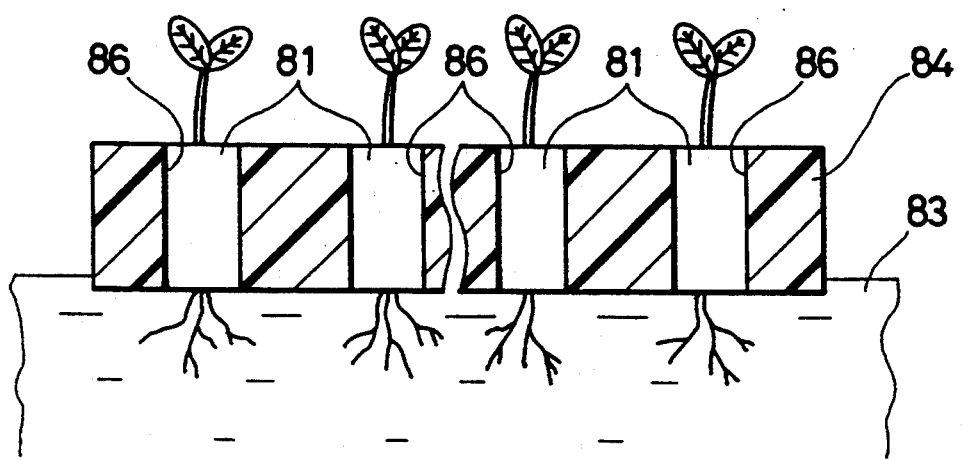
Figure 37:
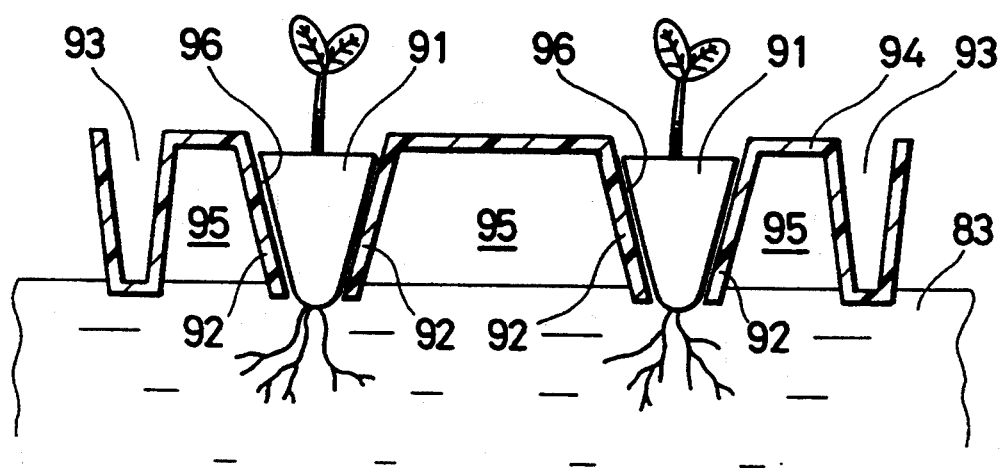

Sapling growth continues in this state. When the saplings have grown to an appropriate size, the rafts 61 are floated one by one on a nutrient solution 75 in a water culture tank 73, as shown in FIG. 29. Plants in the rafts 61 absorb nutrients from the nutrient solution 75 and continue to grow while being transported along with the rafts 61 in the water culture tank 73. Mutual position fixing of the rafts 61 which are adjacent to each other can be effected easily by fixing the convex section 72 of one of the rafts 61 into the concave section 71 of another of the rafts 61. Accordingly, resistance due to contact between the rafts 61 and longitudinal walls 74 of the water culture tank 73 decreases since corners of the rafts 61 no longer collide with the longitudinal walls 74. The transport of the rafts 61 can thereby be carried out smoothly in the water culture tank 73. Moreover, since the concave section 71 and the convex section 72 are trapezoid shaped, the convex section 72 can be easily fixed into the concave section 71 even if relative positions of the rafts 61 shift slightly. Further, the concave section 71 and the convex section 72 need not necessarily be trapezoid shaped and may have any shape as long as the mutual position fixing of the adjacent rafts 61 can be effected by fixing the convex section 72 into the concave section 71. The water culture tank 73 is made of plastic material such as expanded polystyrene.

The plant containers 69 containing plants with poor root growth are replaced when the rafts 61 are to be floated on the nutrient solution 75. Here, the plant containers 69 supporting poorly growing saplings can easily be removed by inserting a finger from the under surface of the raft 61 and pushing out the plant containers 69. This is possible because in the raft 61 of the present embodiment the lower portions 66 of the vertically oriented channels 63 are formed so as to become wider as the lower portions 66 approach the under surface of the raft 61. Replacement of the plant containers 69 thereby becomes very convenient.

Further, the rafts 61 can be handled easily and become easily portable during harvesting since the lower portions 66 of the vertically oriented channels 63 are formed to be wide and fingers can easily be inserted therein.

Moreover, cleaning of the vertically oriented channels 63 can be performed easily from the under surface using a brush or shower since the lower portions 66 of the vertically oriented channels 63 are formed to be wide. Particularly, algae such as spirogyra tend to develop in a vicinity of the lower portions 66 of the vertically oriented channels 63 due to a proximity of the lower portions 66 to the nutrient solution 75. The vicinity of the lower portions 66 can be cleaned very easily because the lower portions 66 are formed to be wide.

Furthermore, after the cleaning has been carried out the rafts 61 may be dried easily by being piled up unidirectionally (FIG. 28), since the lower protruding sections 65 are provided as described earlier on the rafts 61.

Moreover, fumigation operation is simplified since the rafts 61 can be fumigated in the unidirectionally piled up state.

As described above, the rafts 61 of the present embodiment have a configuration whereby the upper protruding sections 62 are provided along the periphery of each of the vertically oriented channels 63.

Accordingly, excess water is prevented from flowing into the plant containers 69 from the vicinity of the vertically oriented channels 63, the excess water having collected on the surface of the rafts 61 due to water sprinkling after sowing the seeds. Consequently, over-humidity of the seeds due to inflow of excess water, movement of the seeds from a fixed position and so on are avoided, thereby improving the germination ratio.

Further, the rafts 61 of the present embodiment have a configuration whereby the lower protruding sections 65 are provided on the under surface thereof.

According to this, damage to the roots is prevented since the gaps form between the adjacent rafts 61 when the rafts 61 are piled up, for example during germination. Moreover, since the rafts 61 can be piled up, a large space is not required for carrying out germination.

Furthermore, when the rafts 61 are rotated relative to each other by 180° and piled up, the lower protruding sections 65 of the overlying rafts 61 are made to loosely fit into the vertically oriented channels 63 of the underlying rafts 61. Consequently, each of the lower protruding sections 65 can be made to serve as a mudcap. An abnormal development of the roots can thereby be prevented and the germination ratio improves.

The invention being thus described, it may be obvious that the same may be varied in many ways. Such variations are not to be regarded as a departure from the scope of the invention.

There are described above novel features which the skilled artisan will appreciate give rise to advantages. These are each independent aspects of the invention to be covered by the present application, irrespective of whether or not they are included within the scope of the following claims.

What is claimed is:

1. A water culture apparatus, comprising:
a water culture tank;
a nutrient solution in said water tank;
rafts floating on said nutrient solution;
vertically oriented channels, comprising ends, in said rafts;
supporting sections extending from the ends of said channels which support plant containers; and
plant an indent space containers inserted in said vertical channels;
wherein said plant containers are disposed above said nutrient solution a distance sufficient to provide an air space between the plant containers and the nutrient solution so that the plant containers do not get submerged in the nutrient solution.

2. A water culture apparatus as set forth in claim 1, wherein each of the supporting sections has base surface sections which contact with base surfaces of the plant containers, the base surface sections being located above the nutrient solution so as to enable the distance from the nutrient solution to the plant containers to be adjusted.

3. A water culture apparatus as set forth in claim 2, wherein a width of each of the base surface sections is less than a width of each of the vertically oriented channels.

4. A water culture apparatus comprising:
a water culture tank;
a nutrient solution in said water tank;
rafts floating on said nutrient solution;
vertically oriented channels in said rafts; and
plant containers inserted in said vertical channels;
wherein said plant containers are disposed above said nutrient solution a distance sufficient to provide an air space between the plant containers and the nutrient solution so that the plant containers do not get submerged in the nutrient solution wherein upper protruding sections are disposed along a periphery of each of the vertically oriented channels to an extent sufficient to prevent such excess water as collects on a surface of each of the rafts in the vicinity of the vertically oriented channels from flowing into the plant containers.

5. A water culture apparatus comprising:
a water culture tank;
a nutrient solution in said water culture tank;
rafts floating on said nutrient solution;
vertically oriented channels in said rafts;
plant containers inserted in said vertical channels; and
lower protruding sections which are disposed on an under surface of each of the rafts so that a gap is formed between rafts which are adjacent to each other.

6. A water culture apparatus as set forth in claim 4, further comprising lower protruding sections which are disposed on an under surface of each of the rafts so that a gap is formed between rafts which are adjacent to each other.

7. A water culture apparatus as set forth in claim 5, wherein the lower protruding sections are disposed so as to loosely fit into the vertically oriented channels upon rotation of alternating rafts relative to each other by 180°.

8. A water culture apparatus as set forth in claim 6, wherein the lower protruding sections are disposed so as to loosely fit into the vertically oriented channels upon rotation of alternating rafts relative to each other by 180°.

9. A water culture apparatus as set forth in claim 1, wherein the vertically oriented channels of the rafts widen as the vertically oriented channels approach an under surface of each of the rafts, in order to facilitate removal of the plant containers.

10. A water culture apparatus comprising:
a water culture tank;
a nutrient solution in said water culture tank;
rafts floating on said nutrient solution;
vertically oriented channels in said rafts;
plant containers inserted in said vertical channels; and
lower inclined-surface sections, which incline towards an inner direction in each of the rafts, formed on side surfaces of the rafts in order to prevent nutrient solution from rising to an upper surface of each of the rafts due to capillary action at contacting parts between the rafts when a plurality of rafts are floated in the water culture tank.

11. A water culture apparatus comprising:
a water culture tank;
a nutrient solution in said water culture tank;
rafts floating on said nutrient solution;
vertically oriented channels in said rafts; and
plant containers inserted in said vertical channels;
wherein said rafts comprise two lateral side surfaces which are orthogonal to a direction of movement of said rafts on said nutrient medium, wherein a concave section is disposed in each of the rafts on one of said two lateral side surfaces, and wherein
a convex section is disposed in a position opposed to the concave section on another of the two lateral side surfaces so as to fit into the concave section,
wherein the concave section and the convex section serve to reduce resistance due to contact between the rafts and the water culture tank by fixing mutual positions of the rafts when a plurality of the rafts are floated in the water culture tank and transported therein.

* * * * *